US008306719B2

(12) United States Patent
Ishizuka

(10) Patent No.: US 8,306,719 B2
(45) Date of Patent: Nov. 6, 2012

(54) LEARNING DEVICE AND FUEL INJECTION SYSTEM

(75) Inventor: Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 619 days.

(21) Appl. No.: 12/486,038

(22) Filed: Jun. 17, 2009

(65) Prior Publication Data

US 2009/0319157 A1 Dec. 24, 2009

(30) Foreign Application Priority Data

Jun. 18, 2008 (JP) ................................. 2008-159488

(51) Int. Cl.
*G06F 19/00* (2006.01)
(52) U.S. Cl. ....................................... 701/102; 123/456
(58) Field of Classification Search .................. 701/106, 701/101–105; 123/447, 456, 480, 674
See application file for complete search history.

(56) References Cited

U.S. PATENT DOCUMENTS

| 6,260,524 | B1 * | 7/2001 | Wachi ......................... 123/90.15 |
| 6,694,953 | B2 * | 2/2004 | Barnes et al. ................. 123/500 |
| 6,729,297 | B2 * | 5/2004 | Futonagane et al. .......... 123/299 |
| 7,021,278 | B2 * | 4/2006 | Ishizuka et al. ............... 123/299 |
| 7,112,154 | B2 * | 9/2006 | Wakahara et al. ............. 474/28 |
| 7,194,392 | B2 * | 3/2007 | Tuken et al. ..................... 703/2 |
| 7,654,252 | B2 * | 2/2010 | Kato et al. ..................... 123/674 |
| 7,881,525 | B2 * | 2/2011 | Mattausch et al. ............ 382/159 |
| 2008/0228374 | A1 | 9/2008 | Ishizuka et al. |
| 2009/0056677 | A1 | 3/2009 | Nakata et al. |
| 2011/0137541 | A1 * | 6/2011 | Malikopoulos ............... 701/106 |

FOREIGN PATENT DOCUMENTS

| JP | 2000-265892 | 9/2000 |
| JP | 2001-117773 | 4/2001 |
| JP | 2003-242184 | 8/2003 |
| JP | 2007-034781 | 2/2007 |
| JP | 2007-187108 | 7/2007 |

OTHER PUBLICATIONS

Japanese Office Action dated Jul. 6, 2010, issued in corresponding Japanese Application No. 2008-159488, with English translation.
Japanese Office Action dated Jan. 19, 2010, issued in corresponding Japanese Application No. 2008-159488, with English translation.
Kanemitsu, Hideo, "On a Method for Global Optimization Problems by Using a Random Search Method and a Local Optimization Method", Integrated Arts and Sciences Laboratory, Hakodate College, Hokkaido University of Education, Hakodate, Japan, Sep. 28, 1990, pp. 69-78.

* cited by examiner

*Primary Examiner* — Mahmoud Gimie
*Assistant Examiner* — David Hamaoui
(74) *Attorney, Agent, or Firm* — Nixon & Vanderhye P.C.

(57) ABSTRACT

A learning device changes each of multiple parameters to an increased side and to a decreased side with respect to a reference value set for each of the multiple parameters. The learning device calculates an approximation degree for each combination of the changes of the multiple parameters. The learning device performs update by using the combination of the changes providing the highest approximation degree among the approximation degrees as the combination of the updated reference values when an update end condition is not satisfied. The update end condition is a condition that the approximation degree at the reference values is higher than any of the approximation degrees after the change. The learning device decides the reference values as learning values of the multiple parameters when the update end condition is satisfied.

14 Claims, 13 Drawing Sheets

LEARNING DEVICE AND FUEL INJECTION SYSTEM

CROSS REFERENCE TO RELATED APPLICATION

This application is based on and incorporates herein by reference Japanese Patent Application No. 2008-159488 filed on Jun. 18, 2008.

BACKGROUND OF THE INVENTION

1. Field of the Invention

The present invention relates to a learning device that learns values of multiple parameters included in a model formula expressing a detected waveform of a sensor with a mathematical expression and to a fuel injection system having the learning device.

2. Description of Related Art

In order to accurately control output torque and an emission state of an internal combustion engine, it is important to accurately control an injection mode of fuel injected from an injector such as injection quantity and injection start timing of the fuel. Therefore, conventionally there has been proposed a technology that senses the actual injection mode by sensing fuel pressure, which fluctuates with the injection.

For example, the technology detects the actual injection start timing by detecting timing when the fuel pressure starts decreasing due to the injection and senses decrease in the fuel pressure caused with the injection to sense the actual injection quantity. If the actual injection mode can be sensed in this way, the injection mode can be controlled accurately based on the sensing value.

When the fluctuation of the fuel pressure is sensed, a fuel pressure sensor (a rail pressure sensor) directly provided to a common rail (a pressure accumulator) cannot sense the fuel pressure fluctuation correctly because the fuel pressure fluctuation caused with the injection is damped inside the common rail. Therefore, according to an invention described in Patent document 1 (JP-A-2000-265892), a fuel pressure sensor is provided to a high-pressure pipe at a connection between the high-pressure pipe and the common rail. The fuel is supplied from the common rail to the injector through the high-pressure pipe. Thus, the invention aims to sense the fuel pressure fluctuation caused with the injection before the fuel pressure fluctuation is damped in the common rail.

A following point should be taken into account when multiple injection (multi-stage injection) for performing fuel injection multiple times per combustion cycle is performed. That is, in the waveform detected with the fuel pressure sensor, a portion of the detected waveform (refer to part (b) of FIG. 7) corresponding to n-th injection is overlapped with a waveform component (refer to part (b) of FIG. 8) resulting from m-th injection preceding the n-th injection. In the example of FIG. 7, m=n−1. In FIGS. 7 and 8, I indicates drive current of the injector and P is the fuel pressure.

Therefore, the inventor of the present invention studied a scheme of extracting the waveform component resulting from the n-th injection by subtracting the waveform component resulting from the m-th injection from the waveform detected with the fuel pressure sensor, thereby sensing the actual injection mode based on the extracted waveform component. More specifically, a model formula expressing the m-th injection waveform component with a mathematical expression is stored beforehand, and a model waveform expressed with the model formula is subtracted from the detected waveform detected with the fuel pressure sensor.

Furthermore, the inventor studied a scheme of learning values of multiple parameters included in the model formula to approximate the model waveform to the actual waveform. More specifically, the values in the entire existence ranges of the parameters are sequentially assigned to the model formula, and the combination of the parameter values that approximates the model waveform to the actual waveform most is calculated. The parameter values calculated in this way are stored as learning values, thereby updating the parameter values.

However, if it is attempted to perform the calculation by assigning the values in the entire existence ranges of all the parameters to the model formula in this way, the number of the combinations of the parameters is enormous, so the arithmetic processing amount necessary for the calculation is enormous. For example, when the seventeen parameters are included and ten values of each parameter are used in the calculation, $10^{17}$ times (=a hundred quadrillion times) of the calculation is necessary.

The problem of such the enormous arithmetic processing amount is not limited to the case of the fuel pressure sensor that senses the fuel pressure change but also occurs similarly in the cases of all the sensors that sense physical quantity changes.

SUMMARY OF THE INVENTION

It is an object of the present invention to provide a learning device and a fuel injection system reducing an arithmetic processing amount.

According to an aspect of the present invention, a learning device has a storing section for storing a model formula expressing a detected waveform with a mathematical expression. The detected waveform is detected with a sensor that detects a physical quantity change. The learning device learns values of multiple parameters included in the model formula to improve an approximation degree of the model waveform expressed. With the model formula with respect to the actual detected waveform. The learning device has a parameter changing section, an approximation degree calculating section, a determining section, a reference value updating section and a learning value deciding section.

The parameter changing section changes each of the multiple parameters to an increased side and to a decreased side with respect to a reference value set for each of the multiple parameters.

The approximation degree calculating section calculates the approximation degree for each combination of the changes of the multiple parameters.

The determining section determines whether an update end condition is satisfied. The update end condition is a condition that the approximation degree in the case where the multiple parameters are set at the reference values is higher than any of the approximation degrees in the case where the parameters are set at the changed values.

The reference value updating section updates the reference values by using the combination of the changes, which provides the highest approximation degree among the approximation degrees corresponding to the changed values, as the updated reference values while the update end condition is not satisfied.

The learning value deciding section decides the reference values as learning values of the multiple parameters when the update end condition is satisfied.

The change by the parameter changing section, the calculation by the approximation degree calculating section and the determination by the determining section are repeatedly performed every time the update is performed by the reference value updating section.

According to the above construction, the arithmetic processing amount can be reduced as compared to the case where the calculation is performed by assigning the values in the entire existence ranges of the entirety of the multiple parameters to the model formula for following reason explained with reference to an example of FIGS. 14A to 14F. In the example of FIGS. 14A to 14F, two parameters A, ω are used, and the existence range of each of the parameters A, ω is divided into ten ranges. Therefore, in this case, the conventional learning device is required to perform $10^2$ times (=100 times) of calculation.

In contrast, according to the above aspect of the present invention, the calculation is performed as follows. That is, for example, when values of the parameters A, ω corresponding to a position of mark 1 are used as the reference values, the values of the parameters A, ω are changed to an increased side and a decreased side respectively with respect to the reference values (as the action of the parameter changing section). That is, the parameter A is changed to values corresponding to positions of marks q, r. The parameter ω is changed to values corresponding to positions of marks s, t.

Then, an approximation degree of the model waveform with respect to the actual detected waveform is calculated for each combination of the changes (as the action of the approximation degree calculating section). That is, the values of the parameters A, ω corresponding to the position of the mark q are assigned to the model formula, and the approximation degree in that case is calculated. Likewise, the approximation degrees for the marks r, s, t are also calculated. Hereafter, an approximation degree at mark x will be indicated as Σx.

Then, it is determined whether the update end condition is satisfied (as the action of the determining section). The update end condition is a condition that the approximation degree Σ1 at the reference values (i.e., the values of the parameters A, ω corresponding to the mark 1) is higher than any of the approximation degrees Σq, Σr, Σs, Σt.

Then, while the update end condition is not satisfied, the reference values are updated by using the combination of the changes in the case where the approximation degree is the highest among the approximation degrees Σq, Σr, Σs, Σt as the combination of the updated reference values (as the action of the reference value updating section). FIG. 14A shows the case where the approximation degree Σr is the highest. The update is performed by using the combination of the values of the parameters A, ω corresponding to the position of the mark r as the updated reference values. Mark 2 in FIG. 14B shows the position corresponding to the reference values of the parameters A, ω after the update.

If the update is performed in this way, the change by the parameter changing section, the calculation by the approximation degree calculating section and the determination by the determining section are repeatedly performed. Therefore, in the example of FIGS. 14A to 14F, the reference values are changed from the values corresponding to the position of the mark 1 to the values corresponding to the position of the mark 2. Then, the values are changed to values corresponding to positions of marks q, r, s, t with respect to the reference values corresponding to the mark 2 as shown in FIG. 14C. Then, the approximation degrees Σq, Σr, Σs, Σt are calculated respectively. Then, it is determined whether the update end condition is satisfied based on the comparison between the approximation degree Σ2 and the approximation degrees Σq, Σr, Σs, Σt. In the example of FIG. 14C, the update is performed by using the combination of the values of the parameters A, ω corresponding to the position of the mark t as the updated reference values. In FIG. 14D, mark 3 expresses the position corresponding to the reference values of the parameters A, ω after the update.

When the update end condition is satisfied, the reference values at the time are decided as the learning values of the parameters A, ω (as the action of the learning value deciding section). In the example of FIG. 14F, the reference values are updated serially in an order from mark 1 to mark 9. An approximation degree Σ9 is compared with approximation degrees Σq, Σr, Σs, Σt corresponding to positions of marks q, r, s, t changed with respect to the mark 9. As the result of the comparison, it is determined that the approximation degree Σ9 is the highest, so the update is ended. The values of the parameters A, ω corresponding to the position of the mark 9 are decided as the learning values.

Thus, with the actions of the parameter changing section, the approximation degree calculating section, the determining section, the reference value updating section and the learning value deciding section, it becomes unnecessary to perform all of the $10^2$ times (=100 times) of the calculation when the approximation degree is calculated. More specifically, the time number of the calculation of the approximation degree in the example of FIGS. 14A to 14F is 36 times (=4×9) consisting of the calculations at q, r, s t for the mark 1, the calculations at q, r, s, t for the mark 2, . . . , and the calculations at q, r, s, t for the mark 9. When the seventeen parameters are used in the example of FIGS. 14A to 14F, the time number of the calculation of the approximation degree is 5780 times even in the worst case. Thus, the calculation processing amount can be reduced greatly as compared to the case where the calculation is performed for the entire combinations and where the time number of the calculation amounts to $10^{17}$ times (=a hundred quadrillion times).

Thus, according to the above aspect of the present invention, the arithmetic processing amount can be reduced as compared to the case where the calculation is performed by assigning the values in the entire existence ranges of the entirety of the multiple parameters to the model formula.

According to another aspect of the present invention, the learning device is provided with an existence area, in which the values of the parameters can exist. The existence area is set beforehand based on waveforms in an area where the detected waveform can exist and is divided into multiple areas. The learning device compares the approximation degrees calculated for representing values set for the respective areas with each other. The learning device uses the representing value, which provides the highest approximation degree, as an initial value of the reference value set before the update performed by the reference value updating section.

With the above construction, the initial value of the reference value can be set close to a value that satisfies the update end condition. Accordingly, when the reference value is updated from the initial value until the update end condition is satisfied, the update time number can be reduced. As a result, the time number of the calculation of the approximation degree can be reduced further and the arithmetic processing amount can be reduced further.

According to another aspect of the present invention, the learning device uses initial values of the multiple parameters before the parameter changing section performs the change, and the initial values are set based on a result of experiment measuring the detected waveform of the sensor with respect to a known physical quantity change.

With the above construction, the initial value of the reference value can be set close to a value that satisfies the update end condition. Accordingly, when the reference value is updated from the initial value until the update end condition is satisfied, the update time number can be reduced. As a result, the time number of the calculation of the approximation degree can be reduced further, and the arithmetic processing amount can be reduced further.

According to another aspect of the present invention, the learning device is provided with an existence range in which the value of the parameter can exist. The existence range is set beforehand based on the waveforms in an area where the detected waveform can exist. The parameter changing section performs the change to the increased side and to the decreased side with a size obtained by dividing the existence range by N, which is a positive integer number.

According to another aspect of the present invention, the parameter changing section decreases amount of the change as time number of the update performed by the reference value updating section increases.

With the above construction, when the reference value is updated from the initial value until the update end condition is satisfied, the update time number can be reduced as compared to the case where the change amount is uniformly small from the initial stage to the later stage of the update. In addition, as compared with the case where the change amount is uniformly large from the initial stage to the later stage of the update, the approximation degree of the reference value at the time point when the update end condition is satisfied can be improved, so the learning accuracy can be improved. That is, the reduction of the update time number and the improvement of the learning accuracy can be achieved at the same time. As an example of implementation of such the construction, the division number N described above may be increased as the time number of the update increases.

According to another aspect of the present invention, the learning device is provided with an existence range, in which the value of the parameter can exist. The existence range is set beforehand based on the waveforms in an area where the detected waveform can exist. The learning device restricts a range of the change by the parameter changing section to the existence range. Accordingly, problems concerning the arithmetic processing such as divergence of the calculated value of the approximation degree can be avoided.

FIG. 18 is a diagram illustrating a relationship between change in a parameter $\omega$ and an approximation degree. For example, in the example of FIG. 18, the value of the parameter $\omega$ is serially changed in an order of $\omega 5$, $\omega 6$, $\omega 7$, $\omega 8$ and $\omega 9$, and the approximation degree heightens serially in an order of $\Sigma 5$, $\Sigma 6$, $\Sigma 7$ and $\Sigma 8$. Therefore, the reference value of the parameter $\omega$ is updated serially in the order of $\omega 5$, $\omega 6$, $\omega 7$ and $\omega 8$. Since the approximation degree $\Sigma 8$ is higher than the approximation degree $\Sigma 9$, the update end condition is satisfied at $\omega 8$. However, even in such the case, there is a possibility that approximation degrees $\Sigma u4$, $\Sigma u5$, $\Sigma u6$ at values $\omega u4$, $\omega u5$, $\omega u6$ are higher than the approximation degree $\Sigma 8$ as shown in FIG. 18. Therefore, in such the case, the learning accuracy falls if the value $\omega 8$ is decided as the learning value.

According to another aspect of the present invention taking this point into account, the learning device changes the reference value more largely than the change performed by the parameter changing section when the update end condition is satisfied. The learning device prohibits the learning value deciding section from deciding the reference value as the learning value when the approximation degree calculated for the parameter after the large change is higher than a predetermined range of the approximation degree calculated for the parameter before the large change.

Therefore, for example, even when the update end condition is satisfied at the value $\omega 8$ as shown in FIG. 18, the value of the parameter $\omega$ is changed largely from the value $\omega 8$ to the value $\omega u4$. When the approximation degree $\omega u4$ is higher than the approximation degree $\Sigma 8$, deciding the value $\omega 8$ as the learning value is prohibited. Accordingly, the above-mentioned fall of the learning accuracy can be avoided.

The above-described condition that the approximation degree calculated for the parameter after the large change (i.e., the approximation degree after the large change) is higher than a predetermined range of the approximation degree calculated for the parameter before the large change (i.e., the approximation degree before the large change) means a condition that the approximation degree after the large change is higher than the approximation degree before the large change in the case where the predetermined range is zero. Even when the approximation degree after the large change is lower than the approximation degree before the large change, the above-described condition is satisfied if the approximation degree after the large change is within the predetermined range.

According to another aspect of the present invention, the learning device updates the reference value by using the value of the parameter after the large change as the updated reference value when the prohibition is performed. Thus, in the example of FIG. 18, the change and the update are performed serially in the order of $\omega u5$ and $\omega u6$ thereafter and the value of the parameter is learned to heighten the approximation degree further. Accordingly, the learning accuracy can be improved.

In the example of FIG. 18, the approximation degree $\Sigma u4$ is higher than the approximation degree $\Sigma 8$. Even in the case where the approximation degree $\Sigma 8$ is higher than the approximation degree $\Sigma u4$, if the approximation degree $\Sigma u5$ is higher than the approximation degree $\Sigma u4$ when the larger change from $\omega 8$ to $\omega u5$ than the change from $\omega 8$ to $\omega u4$ is performed, there is a possibility that the parameter $\omega$ providing the approximation degree higher than the approximation degree $\Sigma 8$ is found.

According to another aspect of the present invention taking this point into account, the learning device performs first change for changing the reference value more largely than the change performed by the parameter changing section and performs second change for changing the reference value more largely than the first change when the update end condition is satisfied. The learning device prohibits the learning value deciding section from deciding the reference value as the learning value when the approximation degree after the second change is higher than a predetermined range of the approximation degree after the first change. Thus, certainty of finding the parameter $\omega$ providing the high approximation degree can be increased, so the fall of the learning accuracy can be avoided.

The above-described condition that the approximation degree after the second change is higher than a predetermined range of the approximation degree after the first change means a condition that the approximation degree after the second change is higher than the approximation degree after the first change in the case where the predetermined range is zero. Even when the approximation degree after the second change is lower than the approximation degree after the first change, the above-described condition is satisfied if the approximation degree after the second change is within the predetermined range.

According to another aspect of the present invention, the learning device updates the reference value by using the value of the parameter after the second change as the updated reference value when the prohibition is performed. Thus, in the example of FIG. 18, the change and the update are performed serially to ωu6 thereafter and the value of the parameter is learned to heighten the approximation degree further. Accordingly, the learning accuracy can be improved.

According to another aspect of the present invention, the learning device calculates multiple deviation amounts between the model waveform and the actual detected waveform at multiple points of the waveform and employs summation of the multiple deviation amounts obtained by the calculation as the approximation degree. The learning device determines that the approximation degree heightens as the value of the summation decreases. It is preferable to use the least-square method in this way since the approximation degree can be calculated easily.

According to another aspect of the present invention, a fuel injection system has the sensor for sensing the physical quantity change and the learning device described above. The sensor is a fuel pressure sensor that is mounted to an internal combustion engine structured to distribute and supply fuel from a pressure accumulator accumulating the fuel to multiple injectors and that senses pressure of the fuel supplied to the injector as the physical quantity change. The fuel pressure sensor is arranged in a fuel passage, which extends from the pressure accumulator to an injection hole of the injector, at a position closer to the injection hole than the pressure accumulator.

Such the fuel pressure sensor requires highly accurate learning. Therefore, it is preferable to apply the above-described learning device capable of reducing the arithmetic processing amount to the fuel pressure sensor since the highly accurate learning can be realized easily by reducing the size of the change performed by the parameter changing section, for example.

According to another aspect of the present invention, as another example related to control using the fuel pressure sensor, the fuel injection system further has an extracting section for extracting a waveform component resulting from n-th injection by subtracting a waveform component resulting from m-th injection preceding the n-th injection from a waveform portion of the detected waveform corresponding to the n-th injection when multiple injection for performing the fuel injection multiple times per combustion cycle is performed. The extracting section uses the model waveform defined by the parameters learned by the learning device as the waveform component resulting from the m-th injection.

The combination of the multiple parameter values that provides the highest approximation degree differs in accordance with the operation state of the internal combustion engine. Therefore, according to yet another aspect of the present invention, the learning device learns the values of the multiple parameters for each operation state of the internal combustion engine in accordance with the operation state of the internal combustion engine. Therefore, the accuracy of the learning can be improved to heighten the approximation degree. Concrete examples of the above-described operation state include rotation speed of an output shaft (a crankshaft), a load of the internal combustion engine, fuel temperature, fuel pressure in the pressure accumulator and the like.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of the present invention will be described with reference to the drawings.

(First Embodiment)

First, an outline of an engine (an internal combustion engine) mounted with a learning device according to the present embodiment will be explained briefly. The present embodiment targets a diesel engine (an internal combustion engine) for a four-wheeled vehicle. The engine performs injection supply (direct injection supply) of high-pressure fuel (for example, light oil at injection pressure of 1000 atmospheres or higher) directly into a combustion chamber. It is assumed that the engine according to the present embodiment is a four-stroke reciprocating diesel engine (the internal combustion engine) having multiple cylinders (for example, in-line four cylinders). In each of the four cylinders #1-#4, a combustion cycle consisting of four strokes of an intake stroke, a compression stroke, a combustion stroke and an exhaustion stroke is sequentially performed in the order of the cylinders #1, #3, #4 and #2 in the cycle of 720 degrees CA (crank angle), and in more detail, while the combustion cycles are deviated from each other by 180 degrees CA between the cylinders.

Next, a fuel system of the engine will be explained.

Figure 1:
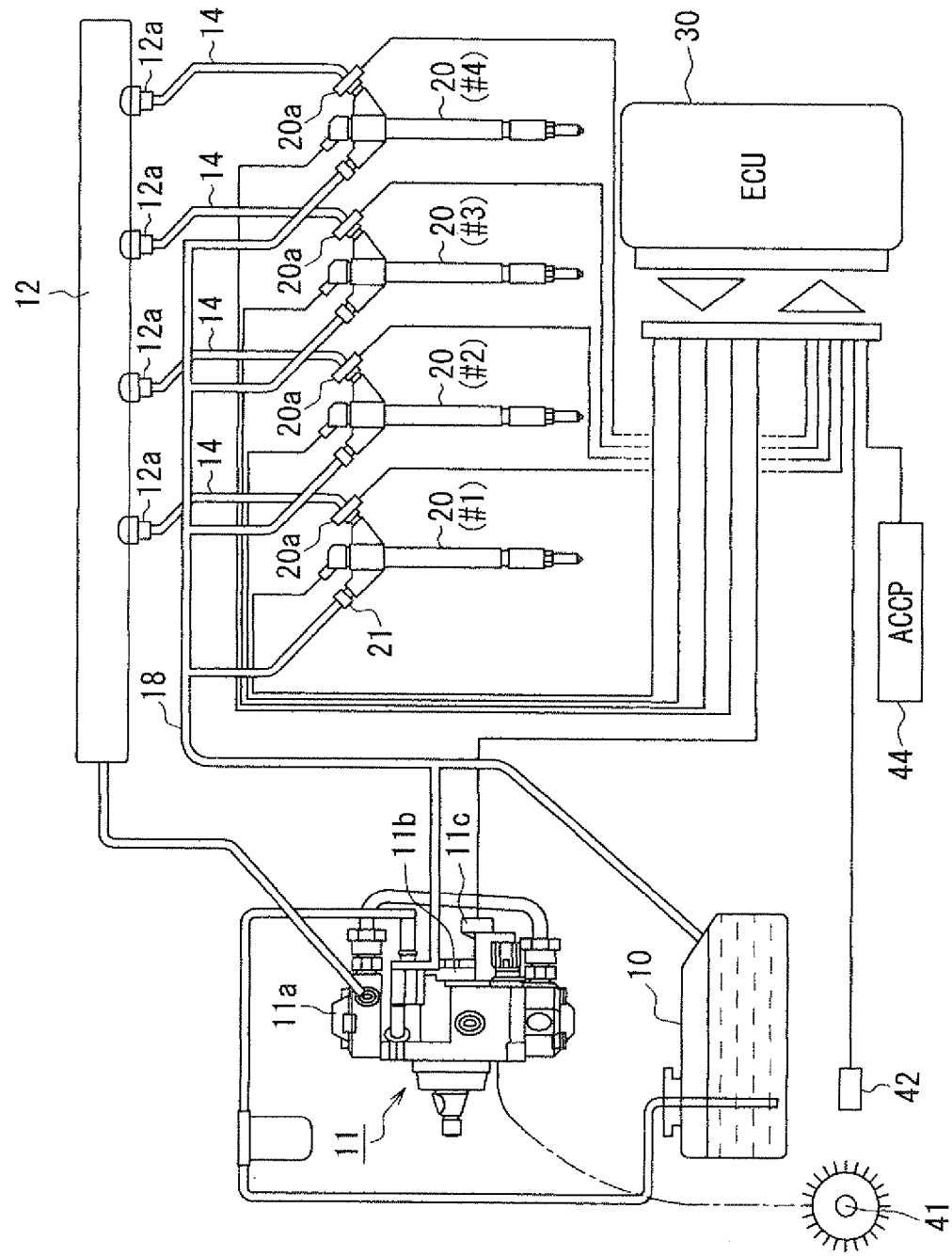
FIG. 1 is a construction diagram schematically showing a fuel system including a learning device according to a first embodiment of the present invention.

FIG. 1 is a configuration diagram of a common rail fuel injection system according to the present embodiment. An ECU 30 (an electronic control unit) provided in the system adjusts supply quantity of current supplied to a suction control valve 11c, thereby controlling fuel discharge quantity of a fuel pump 11 to a desired value. Thus, the ECU 30 performs feedback control (for example, PID control) for conforming fuel pressure in a common rail 12 (a pressure accumulator), i.e., current fuel pressure measured with a fuel pressure sensor 20a, to a target value (target fuel pressure). The ECU 30 controls fuel injection quantity of a predetermined cylinder of the targeted engine and eventual output (i.e., rotation speed of an output shaft or torque) of the targeted engine to desired magnitude.

The devices constituting the fuel supply system including a fuel tank 10, the fuel pump 11, the common rail 12 and injectors 20 (fuel injection valves) are arranged in this order from a fuel flow upstream side. The fuel pump 11 consists of a high-pressure pump 11a and a low-pressure pump 11b driven by the output of the targeted engine. The fuel pump 11 is structured such that fuel drawn by the low-pressure pump 11b from the fuel tank 10 is pressurized and discharged by the high-pressure pump 11a. Fuel pumping quantity sent to the high-pressure pump 11a and eventual fuel discharge quantity of the fuel pump 11 are metered by the suction control valve 11c (SCV) provided on a fuel suction side of the fuel pump 11. The fuel discharge quantity from the fuel pump 11 is controlled to a desired value by regulating drive current (eventually, an opening degree) of the suction control valve 11c.

The low-pressure pump 11b is structured as a trochoid feed pump, for example. The high-pressure pump 11a consists of a plunger pump, for example. The high-pressure pump 11a is structured to be able to sequentially pump the fuel, which is sent to pressurization chambers, at predetermined timing by reciprocating predetermined plungers (for example, three plungers) in axial directions thereof respectively with an eccentric cam (not shown).

The fuel in the fuel tank 10 is pressure-fed (pumped) to the common rail 12 by the fuel pump 11 and is accumulated in the common rail 12 in a high-pressure state. Then, the fuel is distributed and supplied to the injectors 20(#1)-20(#4) of the cylinders #1-#4 respectively through high-pressure pipes 14 provided to the respective cylinders. Fuel discharge holes 21 of the injectors 20(#1)-20(#4) are connected with a pipe 18 for returning excess fuel to the fuel tank 10. An orifice 12a (a fuel pulsation reducing section) is provided between the common rail 12 and the high-pressure pipe 14 for attenuating a pressure pulsation of the fuel flowing from the common rail 12 to the high-pressure pipe 14.

Figure 2:
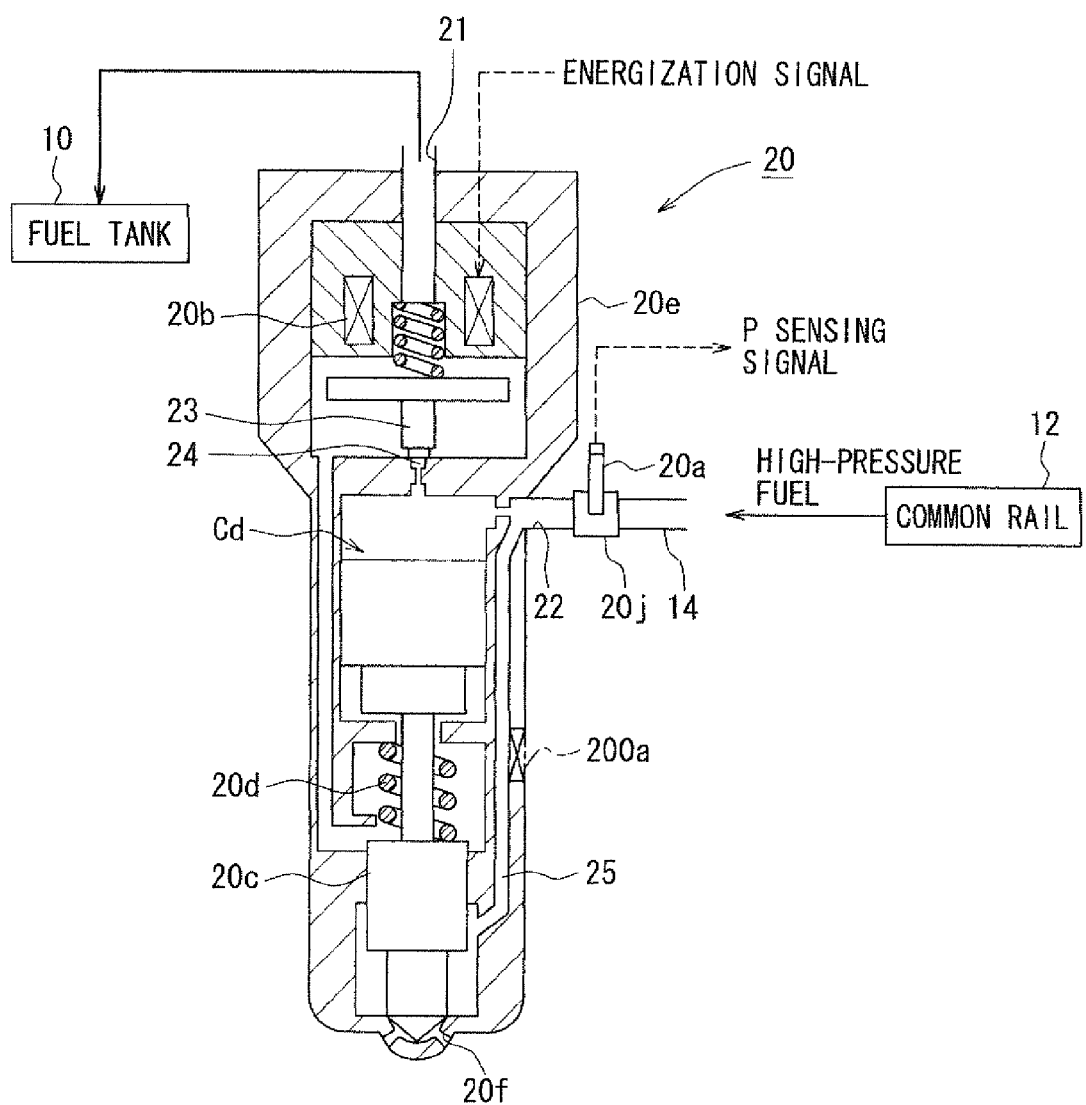
FIG. 2 is an internal side view schematically showing an internal structure of an injector according to the first embodiment.

A detailed structure of the injector 20 is shown in FIG. 2. Basically, the four injectors 20(#1)-20(#4) have the same structure (for example, a structure shown in FIG. 2). Each injector 20 is a hydraulic drive type injector using the engine fuel, which is to be combusted, i.e., the fuel in the fuel tank 10. In the injector 20, a driving force for the fuel injection is transmitted through an oil pressure chamber Cd (i.e., a control chamber). As shown in FIG. 2, the injector 20 is structured as a fuel injection valve of a normally-closed type that is brought to a valve-closed state when de-energized.

The high-pressure fuel sent from the common rail 12 flows into a fuel inlet 22 formed in a housing 20e of the injector 20. Part of the inflowing high-pressure fuel flows into the oil pressure chamber Cd and the other part of the inflowing high-pressure fuel flows toward injection holes 20f. A leak hole 24 is formed in the oil pressure chamber Cd and is opened and closed by a control valve 23. If the leak hole 24 is opened by the control valve 23, the fuel in the oil pressure chamber Cd is returned to the fuel tank 10 through the leak hole 24 and the fuel discharge hole 21.

When the injector 20 performs the fuel injection, the control valve 23 is operated in accordance with an energization state (energization/de-energization) of a solenoid 20b constituting a two-way electromagnetic valve. Thus, a sealed degree of the oil pressure chamber Cd and eventually pressure in the oil pressure chamber Cd (equivalent to back pressure of a needle valve 20c) are increased/decreased. Due to the increase/decrease in the pressure, the needle valve 20c reciprocates (moves upward and downward) inside the housing 20e along with or against an extension force of a spring 20d (a coil spring) (i.e., an elastic force of the spring 20d to extend). Accordingly, a fuel supply passage 25 extending to the injection holes 20f (a necessary number of which are bored) is opened/closed at a certain point in the fuel supply passage 25, or more specifically, at a tapered seat face. The needle valve 20c is seated on the tapered seat face and is separated from the tapered seat face in accordance with the reciprocating motion of the needle valve 20c.

Drive control of the needle valve 20c is performed by on-off control. That is, a pulse signal (an energization signal) directing ON/Off is sent from the ECU 30 to the drive section (the two-way electromagnetic valve) of the needle valve 20c. The needle valve 20c lifts and opens the injection holes 20f when the pulse is ON (or OFF), and the needle valve 20c descends to block the injection holes 20f when the pulse is OFF (or ON).

Pressurization processing of the oil pressure chamber Cd is performed by the fuel supply from the common rail 12. Depressurization processing of the oil pressure chamber Cd is performed by operating the control valve 23 through the energization to the solenoid 20b and thereby opening the leak hole 24. Thus, the fuel in the oil pressure chamber Cd is returned to the fuel tank 10 through the pipe 18 (shown in FIG. 1) connecting the injector 20 and the fuel tank 10. That is, the operation of the needle valve 20c that opens and closes the injection holes 20f is controlled by adjusting the fuel pressure in the oil pressure chamber Cd through the opening and closing operation of the control valve 23.

As described above, the injector 20 has the needle valve 20c that performs valve opening and valve closing of the injector 20 by opening and closing the fuel supply passage 25 extending to the injection holes 20f based on the predetermined reciprocation operation inside the valve body (i.e., the housing 20e). In a non-driven state, the needle valve 20c is displaced to a valve-closing side by the force (the extension force of the spring 20d) constantly applied to the needle valve 20c in the valve-closing direction. In a driven state, the needle valve 20c is applied with a driving force, so the needle valve 20c is displaced to a valve-opening side against the extension force of the spring 20d. The lift amount of the needle valve 20c changes substantially symmetrically between the non-driven state and the driven state.

The fuel pressure sensor 20a (also refer to FIG. 1) for sensing the fuel pressure is fixed to the injector 20. More specifically, in the present embodiment, the fuel inlet 22 formed in the housing 20e and the high-pressure pipe 14 are connected with each other through a jig 20j, and the fuel pressure sensor 20a is fixed to the jig 20j. By fixing the fuel pressure sensor 20a to the fuel inlet 22 of the injector 20 in this way, the fuel pressure (inlet pressure) at the fuel inlet 22 can be sensed at any time. More specifically, a fluctuation waveform of the fuel pressure accompanying the injection operation of the injector 20, a fuel pressure level (i.e., stable pressure), fuel injection pressure and the like can be sensed (measured) with the output of the fuel pressure sensor 20a.

The fuel pressure sensors 20a are provided to the multiple injectors 20(#1)-20(#4) respectively. The fluctuation waveform of the fuel pressure accompanying the injection operation of the injector 20 concerning a predetermined injection can be sensed with high accuracy based on the outputs of the fuel pressure sensors 20a (as mentioned in more detail later).

A microcomputer mounted in the ECU 30 consists of a CPU (a basic processing unit) for performing various kinds of computation, RAM as a main memory for temporarily storing data in the process of the computation, computation results and the like, ROM as a program memory, EEPROM as a memory for data storage, backup RAM (a memory constantly supplied with a power from a backup power supply such as an in-vehicle battery even after a main power supply of the ECU 30 is stopped) and the like. Various programs, various control maps and the like concerning the engine control including a program concerning the fuel injection control are stored in the ROM beforehand. Various control data including design data of the targeted engine are stored in the memory for data storage (for example, the EEPROM) beforehand.

The ECU 30 calculates a rotation angle position and rotation speed (engine rotation speed NE) of an output shaft (a crankshaft 41) of the targeted engine based on a sensing signal inputted from a crank angle sensor 42. The ECU 30 calculates an operation amount ACCP (a pressed amount) of an accelerator by a driver based on a sensing signal inputted from an accelerator sensor 44. The ECU 30 grasps an operation state of the targeted engine and requests of a user based on the sensing signals of the above-described various sensors 42, 44 and various sensors mentioned later. The ECU 30 operates the various actuators such as the above-described suction control valve 11c and the injectors 20 in accordance with the operation state of the targeted engine and the requests of the user. Thus, the ECU 30 performs various kinds of control related to the above-described engine in the optimum modes corresponding to the situation of each time.

Next, an outline of control of the fuel system performed by the ECU 30 will be explained.

The microcomputer of the ECU 30 calculates fuel injection quantity in accordance with the engine operation state (such as the engine rotation speed NE), the operation amount ACCP of the accelerator by the driver and the like at each time and outputs an injection control signal (an injection command signal) for directing the fuel injection of the calculated fuel injection quantity to the injector 20 in synchronization with desired injection timing. When the injector 20 operates with a drive amount (for example, a valve opening period) corresponding to the injection control signal, the output torque of the targeted engine is controlled to a target value.

Figure 3:
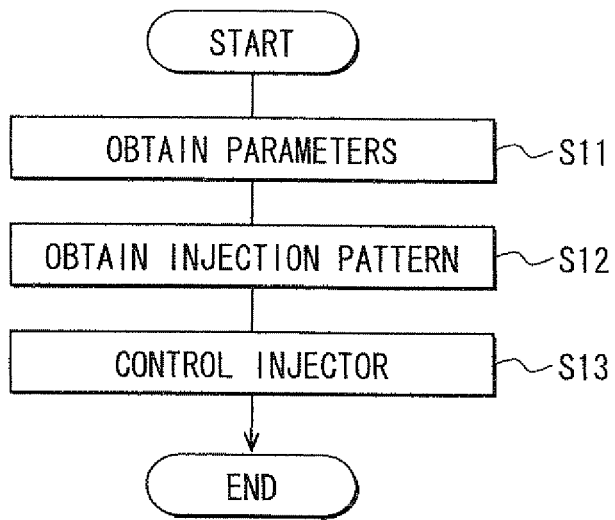
FIG. 3 is a flowchart showing a basic procedure of fuel injection control processing according to the first embodiment.

Hereafter, a basic processing procedure of the above-described fuel system control according to the present embodiment will be explained with reference to FIG. 3. Values of the various parameters used in the processing shown in FIG. 3 are stored at any time in the storage device mounted in the ECU 30 such as the RAM, the EEPROM or the backup RAM and are updated at any time when necessary. Basically, the ECU 30 executes the programs stored in the ROM to perform the processing shown by the flowchart of FIG. 3.

As shown in FIG. 3, first in S11 (S means "Step") in a series of the processing, predetermined parameters such as the engine rotation speed NE (i.e., an actual measurement value of the crank angle sensor 42) and the fuel pressure (i.e., an actual measurement value of the fuel pressure sensor 20a) at the time are read and also the accelerator operation amount ACCP (i.e., an actual measurement value of the accelerator sensor 44) by the driver at the time and the like are read.

In following S12, an injection pattern is set based on the various parameters read in S11. For example, in the case of a single-stage injection, injection quantity (an injection period) of the injection is variably set in accordance with the torque that should be generated in the output shaft (the crankshaft 41), i.e., the request torque that is calculated from the accelerator operation amount ACCP and the like and that is equivalent to the engine load at the time. In the case of a multi-stage injection, total injection quantity (a total injection period) of injections contributing to the torque is variably set in accordance with the torque that should be generated in the crankshaft 41, i.e., the request torque.

The injection pattern is obtained based on a predetermined map (an injection control map or a mathematical expression) and a correction coefficient stored in the ROM, for example. More specifically, for example, the optimum injection patterns (adapted values) are beforehand obtained by experiment and the like in anticipated ranges of the predetermined parameters (read in S11) and are written in the injection control map beforehand.

For example, the injection pattern is defined by parameters such as the number of the injection stage(s) (i.e., the time number of injection(s) performed in one combustion cycle), the injection timing of each injection (i.e., the injection timing) and the injection period (equivalent to the injection quantity). Thus, the above-described injection control map indicates the relationship between the parameters and the optimum injection pattern.

The injection pattern obtained based on the injection control map is corrected with the correction coefficient (stored in the EEPROM in the ECU 30, for example) that is separately updated. For example, a set value is calculated by dividing the map value by the correction coefficient. Thus, the injection pattern of the injection that should be performed at the time and eventually the injection command signal for the injector 20 corresponding to the injection pattern are acquired. The correction coefficient (more strictly, a predetermined coefficient out of the multiple types of coefficients) is sequentially updated by separate processing during the operation of the internal combustion engine.

When the injection pattern is set (in S12), maps set individually for the respective elements of the injection pattern (such as the number of the injection stages) may be used. Alternatively, maps, each of which is made for some collective elements of the injection pattern, or a map for all the elements of the injection pattern may be used.

The thus set injection pattern and the eventual command value (the injection command signal) corresponding to the injection pattern are used in following S13. That is, in S13 (a command signal outputting section), the drive of the injector 20 is controlled based on the command value (the injection command signal), or in more detail, by outputting the injection command signal to the injector 20. After the drive control of the injector 20, the series of the processing shown in FIG. 3 ends.

Next, processing for estimating the fuel injection quantity of the injector 20 will be explained with reference to FIG. 4.

Figure 4:
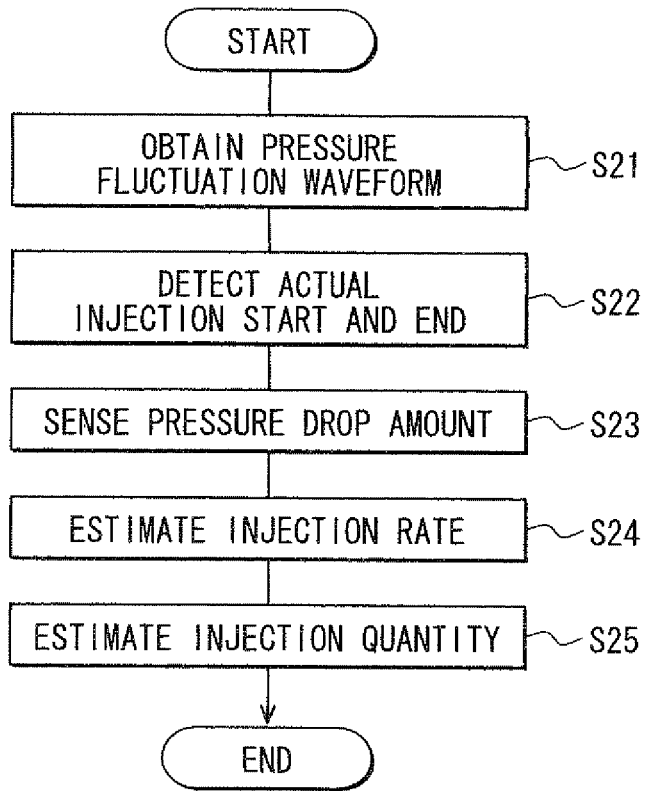
FIG. 4 is a flowchart showing a processing procedure of fuel injection quantity estimation based on sensed pressure of a fuel pressure sensor according to the first embodiment.

A series of processing shown in FIG. 4 is performed in a predetermined cycle (for example, a cycle of the computation performed by the CPU described above) or at every predetermined degrees of the crank angle. First, in S21, the output value (sensed pressure P) of the fuel pressure sensor 20a is taken. This processing for taking in the output value is performed for each of the multiple fuel pressure sensors 20a. Hereafter, the output value taking processing of S21 will be explained in more detail with reference to FIG. 5.

Figure 5:
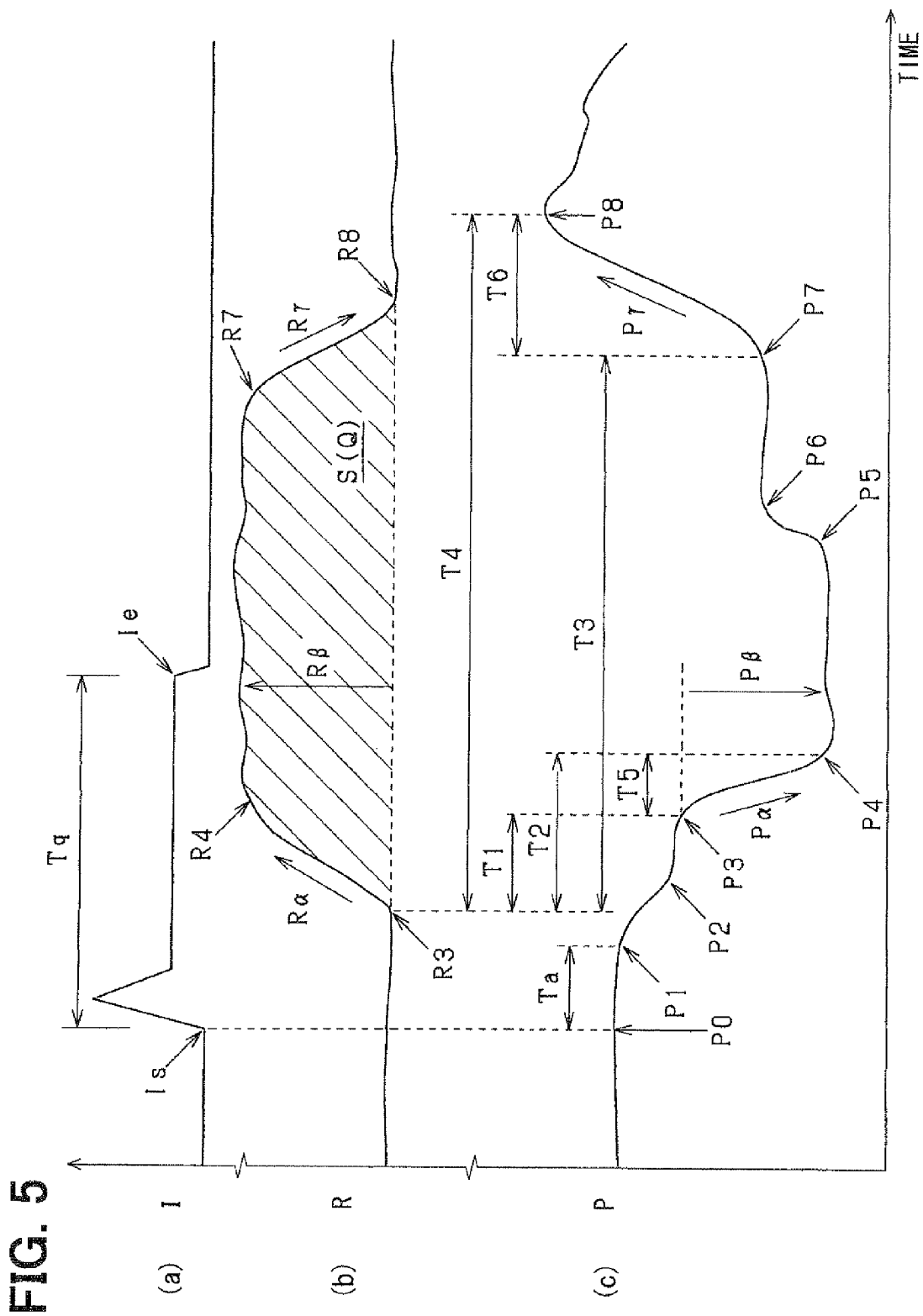
FIG. 5 is a timing chart showing a relationship between a fluctuation waveform of the sensed pressure and an injection rate transition waveform according to the first embodiment.

Part (a) of FIG. 5 shows the injection command signal I outputted to the injector 20 in S13 of FIG. 3. The solenoid 20b is operated by switching on of a pulse (i.e., pulse-on) of the command signal I, and thus the injection holes 20f are opened. That is, an injection start is commanded at pulse-on timing Is of the injection command signal I, and an injection end is commanded at pulse-off timing Ie. Therefore, the injection quantity Q is controlled by controlling a valve opening period Tq of the injection holes 20f with a pulse-on period of the command signal I (i.e., an injection command period). Part (b) of FIG. 5 shows change (transition) of a fuel injection rate R of the fuel from the injection holes 20f caused in connection with the above-described injection command. Part (c) of FIG. 5 shows change (a fluctuation waveform) of the output value (the sensed pressure P) of the fuel pressure sensor 20a caused with change of the injection rate R. FIG. 5 shows an example of the various changes at the time when the injection holes 20f are opened and closed once.

The ECU 30 detects the output value of the fuel pressure sensor 20a by subroutine processing separate from the processing of FIG. 4. The ECU 30 sequentially obtains the output values of the fuel pressure sensor 20a by the subroutine processing at an interval short enough to plot the profile of the pressure transition waveform with the sensor output, i.e., at an interval shorter than the processing cycle of FIG. 4. An example profile is illustrated in part (c) of FIG. 5. More specifically, the sensor output is serially obtained at an interval shorter than 50 microseconds (or more preferably, 20 microseconds).

The transition waveform of the injection rate R can be estimated from the fluctuation waveform of the sensed pressure P sensed by the fuel pressure sensor 20a since there is a correlation between the fluctuation of the sensed pressure P and the change of the injection rate R as explained below.

The change of the injection rate R shown in part (b) of FIG. 5 will be explained below. First, after the energization to the solenoid 20b is started at the timing Is, the fuel injection from the injection holes 20f is started and therefore the injection rate R starts increasing at a changing point R3. That is, the actual injection is started. Then, the injection rate R reaches the maximum injection rate Rβ at a changing point R4, and the increase of the injection rate R stops. This is because the needle valve 20c starts lifting at the timing of R3 and the lift amount is maximized at the timing of R4.

In the description of the present embodiment, the changing point is defined as follows. That is, a second order differential value of the injection rate R (or the sensed pressure P of the pressure sensor 20a) is calculated. An extremum of a waveform showing change of the second order differential value (i.e., a point where the change is maximized) is the changing point of the waveform of the injection rate R or the sensed pressure P. That is, an inflection point of the second order differential value waveform is the changing point of the waveform of the injection rate R or the sensed pressure P.

Then, after the energization to the solenoid 20b is blocked at the timing Ie, the injection rate R starts decreasing at a changing point R7. Then, the injection rate R becomes zero at a changing point R8, and the actual injection ends. This is because the needle valve 20c starts descending at the timing of R7 and descends thoroughly at the timing of R8, thereby closing the injection holes 20f.

Next, the change of the sensed pressure P of the pressure sensor 20a shown in part (c) of FIG. 5 will be explained. Pressure P0 before a changing point P1 is fuel supply pressure at the injection command timing Is. First, the sensed pressure P decreases at the changing point P1 after the drive current I flows through the solenoid 20b and before the injection rate R starts increasing at the timing of R3. This is because the control valve 23 opens the leak hole 24 at the timing of P1 and depressurizing processing of the oil pressure chamber Cd is performed. Then, the pressure decrease from the changing point P1 stops at a changing point P2 once when the oil pressure chamber Cd is depressurized sufficiently.

Then, as the injection rate R starts increasing at the timing of R3, the sensed pressure P starts decreasing at a changing point P3. Then, as the injection rate R reaches the maximum injection rate at timing of R4, the decrease of the sensed pressure P stops at a changing point P4. The decrease from the changing point P3 to the changing point P4 is larger than the decrease from the changing point P1 to the changing point P2.

Then, the sensed pressure P increases at a changing point P5. This is because the control valve 23 closes the leak hole 24 at the timing of P5 and the pressurizing processing of the oil pressure chamber Cd is performed. Then, the pressure increase from the changing point P5 stops at a changing point P6 when the oil pressure chamber Cd is pressurized sufficiently.

Then, as the injection rate R starts decreasing at timing of R7, the sensed pressure P starts increasing at a changing point P7. Then, as the injection rate R becomes zero and the actual injection ends at timing of R8, the increase of the sensed pressure P stops at a changing point P8. The increase from the changing point P7 to the changing point P8 is larger than the increase from the changing point P5 to the changing point P6. The sensed pressure P after the changing point P8 attenuates while repeating the decrease and the increase in a fixed cycle T7 (refer to FIG. 6).

Thus, the increase start timing R3 (i.e., the actual injection start timing), the maximum injection rate reaching timing R4, the injection rate decrease start timing R7 and the decrease end timing R8 (i.e., the actual injection end timing) of the injection rate R and the like can be estimated by detecting the changing points P3, P4, P7, P8 in the fluctuation of the sensed pressure P sensed by the fuel pressure sensor 20a. Moreover, the change of the injection rate R can be estimated from the fluctuation of the sensed pressure P based on the correlation between the fluctuation of the sensed pressure P and the change of the injection rate R explained below.

That is, there is a correlation between a pressure decrease rate Pα from the changing point P3 to the changing point P4 of the sensed pressure P and an injection rate increase rate Rα from the changing point R3 to the changing point R4 of the injection rate R. There is a correlation between a pressure increase rate Pγ from the changing point P7 to the changing point P8 and an injection rate decrease rate Rγ from the changing point R7 to the changing point R8. There is a correlation between a pressure drop amount Pβ (the maximum drop amount) from the changing point P3 to the changing point P4 and an injection rate increase amount Rβ (i.e., the maximum injection rate) from the changing point R3 to the changing point R4. Accordingly, the injection rate increase rate Rα, the injection rate decrease rate Rγ and the injection rate increase amount Rβ can be estimated by sensing the pressure decrease rate Pα, the pressure increase rate Pγ and the pressure drop amount Pβ from the fluctuation of the sensed pressure P sensed by the fuel pressure sensor 20a. As described above, the various states R3, R4, R7, R8, Rα, Rβ, Rγ of the injection rate R can be estimated, and eventually, the change (the transition waveform) of the fuel injection rate R shown in part (b) of FIG. 5 can be estimated. In part (c) of FIG. 5, Ta is a leak response delay and T1 is an injection response delay.

An integration value of the injection rate R from the actual injection start to the actual injection end (i.e., a shaded area indicated by mark S in part (b) of FIG. 5) is equivalent to the injection quantity. An integration value of the pressure P in a portion of the fluctuation waveform of the sensed pressure P corresponding to the change of the injection rate R from the actual injection start to the actual injection end (i.e., a portion from the changing point P3 to the changing point P8) is correlated with the integration value S of the injection rate R. Therefore, the injection rate integration value S equivalent to the injection quantity Q can be estimated by calculating the pressure integration value from the fluctuation of the sensed pressure P sensed by the fuel pressure sensor 20a. Thus, it can be said that the fuel pressure sensor 20a functions as an injection quantity sensor for sensing the pressure of the fuel supplied to the injector 20 as physical quantity related to the injection quantity.

In S22 of FIG. 4 subsequent to S21 described above, appearance timings of the changing points P3, P8 and the like are detected from the fluctuation waveform obtained in S21. More specifically, it is preferable to calculate a first order differential value of the fluctuation waveform and to detect the appearance of the changing point P3 when the differential value exceeds a threshold value for the first time after the pulse-on timing Is of the injection command I. Moreover, in the case where a stable state (i.e., a state where the differential value fluctuates within a range of the threshold value) occurs after the appearance of the changing point P3, it is preferable to detect the appearance of the changing point P8 when the differential value falls below the threshold value for the last time before the stable state.

In following S23, the pressure drop amount Pβ, is sensed from the fluctuation waveform obtained in S21. For example, the pressure drop amount Pβ is sensed by subtracting the sensed pressure P at the timing of the changing point P3 from a peak value of the sensed pressure P between the changing point P3 and the changing point P8 of the fluctuation waveform.

In following S24, the increase start timing R3 (the actual injection start timing) and the decrease end timing R8 (the actual injection end timing) of the injection rate R are estimated based on the sensing results P3, P8 of S22. Moreover, the injection rate increase amount Rβ is estimated based on the sensing result Pβ in S23. Then, the transition waveform of the injection rate R as shown in part (b) of FIG. 5 is calculated at least based on the estimates R3, R8, Rβ. The values R4, R7, Rα, Rγ and the like may be estimated in addition to the estimates R3, R8, Rβ and used to calculate the injection rate transition waveform.

In following S25, the area S is calculated by performing integration of the injection rate transition waveform calculated in S24 in an interval from R3 to R8. The area S is estimated as the injection quantity Q. Thus, a series of the processing of FIG. 4 ends. The fuel injection quantity Q estimated in S25 and the injection rate transition waveform estimated in S24 are used for updating (i.e., learning) the above-described injection control map used in S12 of FIG. 3, for example.

Figure 6:
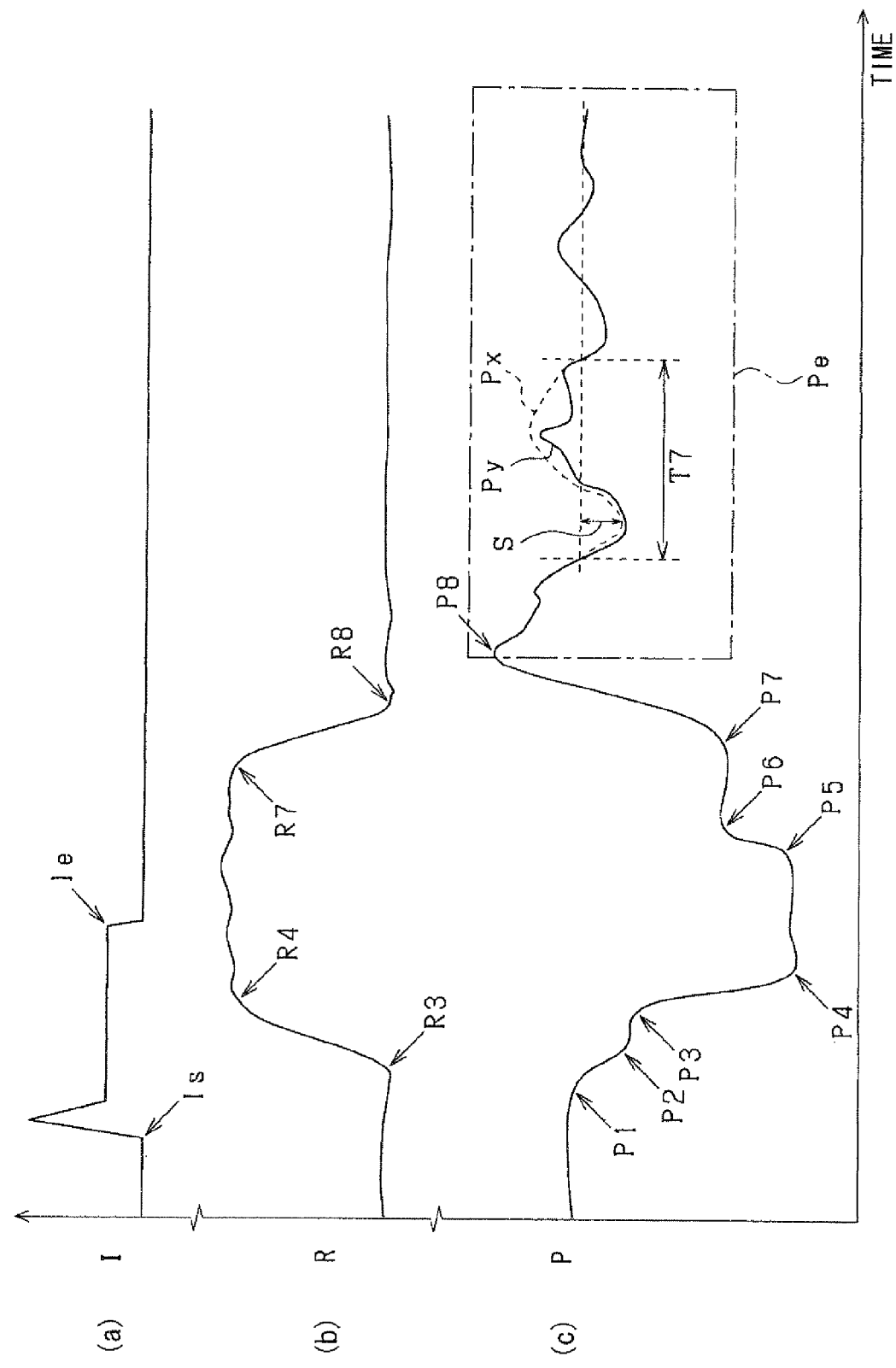
FIG. 6 is a timing chart showing a detection mode of an injection characteristic according to the first embodiment.

FIG. 6 shows an example of various changes in the case where the injection holes 20f are opened and closed once like FIG. 5. FIG. 6 is a timing chart showing change of the output value (the sensed pressure P) of the fuel pressure sensor 20a after the changing point P8 arises in connection with the injection end. In each of FIGS. 7 to 10, part (a) is a timing chart showing the command signal (i.e., the drive current I) for the injector 20 and part (b) is a timing chart showing the fluctuation waveform of the sensed pressure P based on the command signal I.

When the multi-stage injection control for injecting the fuel multiple times per combustion cycle is performed, a following point should be taken into account. That is, in the case where m-th injection (which is the first injection in the present embodiment) is performed before n-th injection that is posterior to the first injection, a portion of a fluctuation pattern of the fluctuation waveform occurring in connection with the m-th injection, the portion existing after the injection end, i.e., a fluctuation pattern portion surrounded by a chained line Pe in FIG. 6, is superimposed on (i.e. interferes with) a fluctuation pattern of another portion of the fluctuation waveform corresponding to the n-th injection. Hereafter, the fluctuation pattern surrounded by the chained line Pe in FIG. 6 will be referred to as an after-injection fluctuation pattern Pe.

Figure 7:
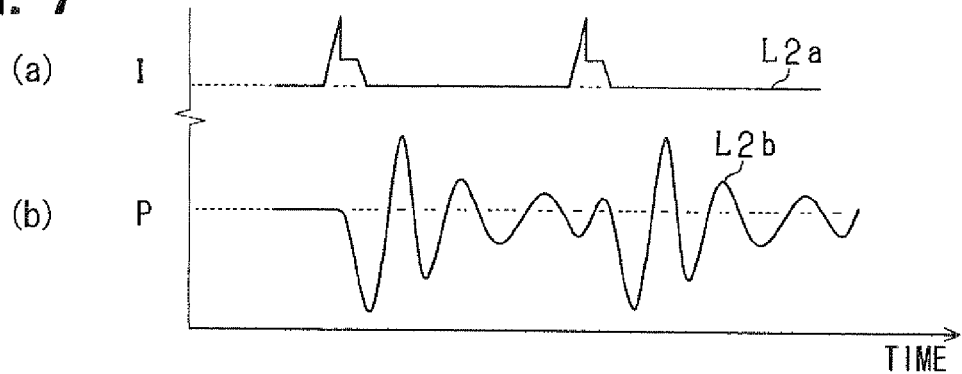
FIG. 7 is a timing chart showing a detection mode of an injection characteristic according to the first embodiment.

More concrete explanation will be given below. In the case where the injection is performed twice per combustion cycle as shown in FIG. 7, a fluctuation waveform shown by a solid line L2b in part (b) of FIG. 7 arises with respect to an energization pulse shown by a solid line L2a in part (a) of FIG. 7. In the proximity of injection start timing of the injection of the latter stage (the latter stage injection) between the two injections shown in FIG. 7, the fluctuation pattern caused only by the latter stage injection and the fluctuation pattern of the injection of a former stage (the former stage injection) interfere with each other. It is difficult to recognize the fluctuation pattern caused only by the latter stage injection.

Figure 8:
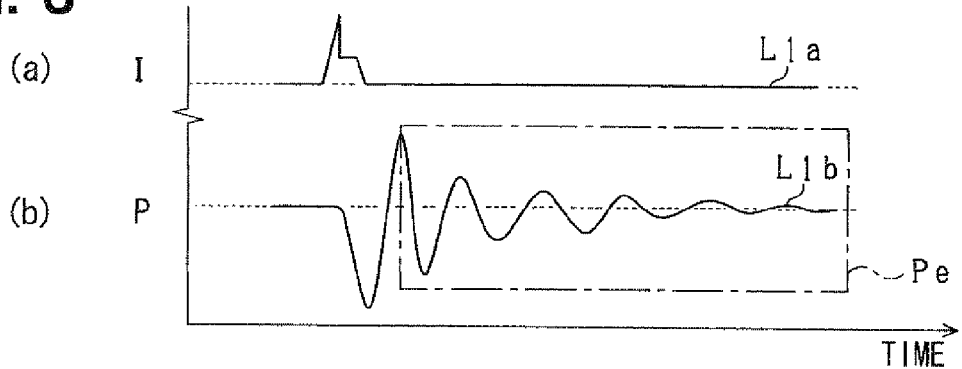
FIG. 8 is a timing chart showing a detection mode of an injection characteristic according to the first embodiment.
Figure 9:
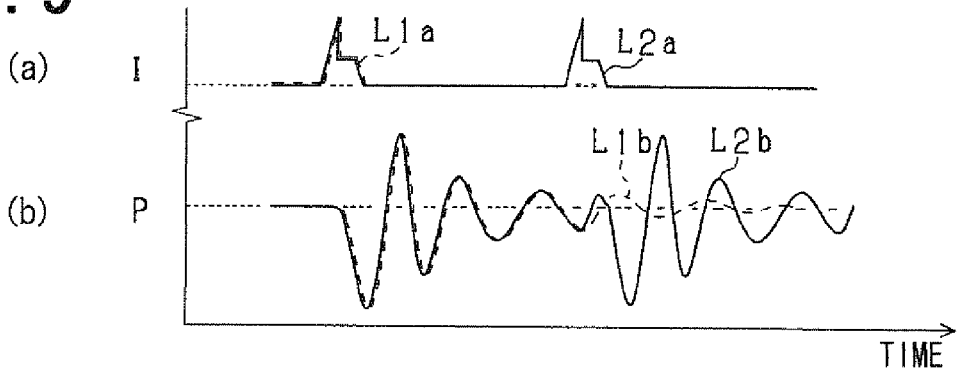
FIG. 9 is a timing chart showing the detection mode of the injection characteristic according to the first embodiment.
Figure 10:
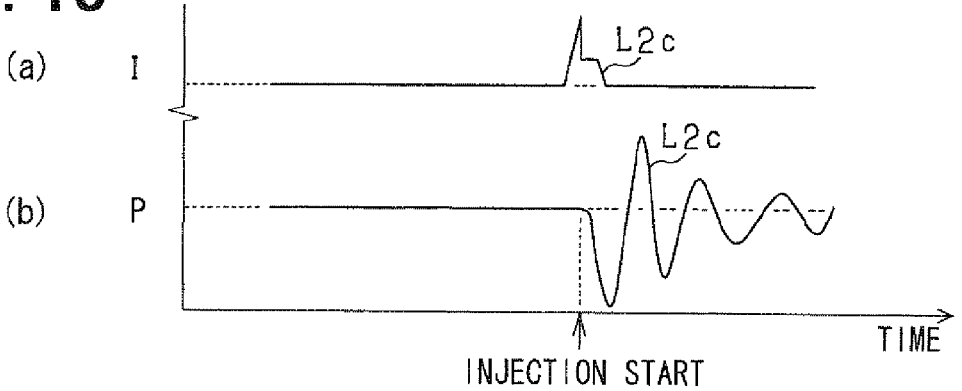
FIG. 10 is a timing chart showing a detection mode of the injection characteristic according to the first embodiment.

When only the former stage injection is performed as shown in FIG. 8, a fluctuation waveform shown by a solid line L1b in part (b) of FIG. 8 arises with respect to an energization pulse shown by a solid line L1a in part (a) of FIG. 8. The fluctuation waveform shown by the solid line L1b in part (b) of FIG. 8 will be referred to as an m-th injection waveform component, hereafter FIG. 9 is a diagram showing the energization pulse and the fluctuation waveform of FIG. 7 (solid lines L2a, L2b) and the energization pulse and the fluctuation waveform of FIG. 8 (broken line L1a, L1b) in an overlapped manner respectively. By subtracting the fluctuation waveform L1b of FIG. 8 from the fluctuation waveform L2b of FIG. 7, a fluctuation pattern caused only by the latter stage injection can be extracted as shown by a solid line L2c in FIG. 10. The subtraction is performed between points corresponding to each other.

Therefore, when the output value (the sensed pressure P) of the fuel pressure sensor 20a is taken in S21 of FIG. 4, the fluctuation waveform L2b shown in part (b) of FIG. 7 is not taken as it is but the fluctuation pattern L2c extracted by subtracting the fluctuation waveform L1b from the fluctuation waveform L2b is taken.

Next, a method of obtaining the fluctuation waveform L1b used for the subtraction will be explained.

A model formula that expresses the m-th injection waveform component with a mathematical expression is beforehand stored in a storage device such as a data storage memory (for example, the EEPROM). The model waveform expressed with the model formula is obtained as the above-mentioned fluctuation waveform L1b. In the present embodiment, following Expression 1 that overlaps multiple damped oscillation equations is adopted as the above-described model formula.

$$p = p_0 + \sum_{i=1}^{n} A_i \exp(-k_i t) \sin(\omega_i t + \theta_i)$$ Expression 1 p in Expression 1 represents a value of the model waveform expressed by the model formula (i.e., an estimate of the sensed pressure P of the fuel pressure sensor 20a). Hereafter, the actual waveform detected with the fuel pressure sensor 20a when the single-stage injection is performed as shown in FIG. 8 or when there is no interference of the waveform component caused by the other injection will be referred to as the detected waveform. p0 in Expression 1 represents an offset deviation of the model waveform from the detected waveform. n in Expression 1 represents the number of the overlaps of the damped oscillation equations. A, k, ω and θ in Expression 1 represent amplitude, a damping coefficient, frequency and a phase of the damped oscillation respectively.

The model formula shown by Expression 1 can output the value p of the model waveform if the parameters p0, n, A, k, ω, θ are decided. For example, when n 4, four damped oscillation equations decided by the four parameters A, k, ω, θ are overlapped with each other. Therefore, the value of p can be obtained by deciding the sixteen parameters A, k, ω, θ and one parameter p0 (seventeen parameters as a total).

The model waveform represented by the model formula of Expression 1 is naturally the continuous waveform. The model waveform has no point, at which the waveform changes discretely. The model waveform is a damped waveform that attenuates while repeating monotonous increase and monotonous decrease.

Figure 11A:
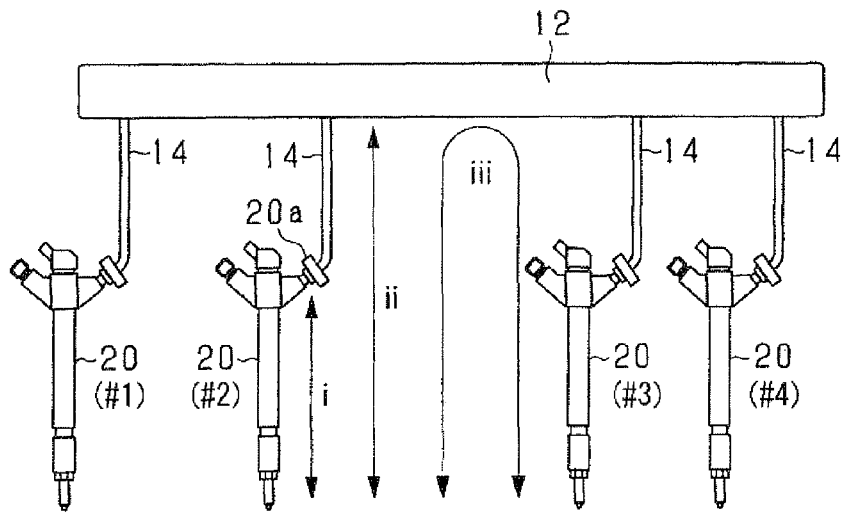
FIGS. 11A and 11B are schematic diagrams for explaining damped oscillation equations according to the first embodiment.
Figure 11B:
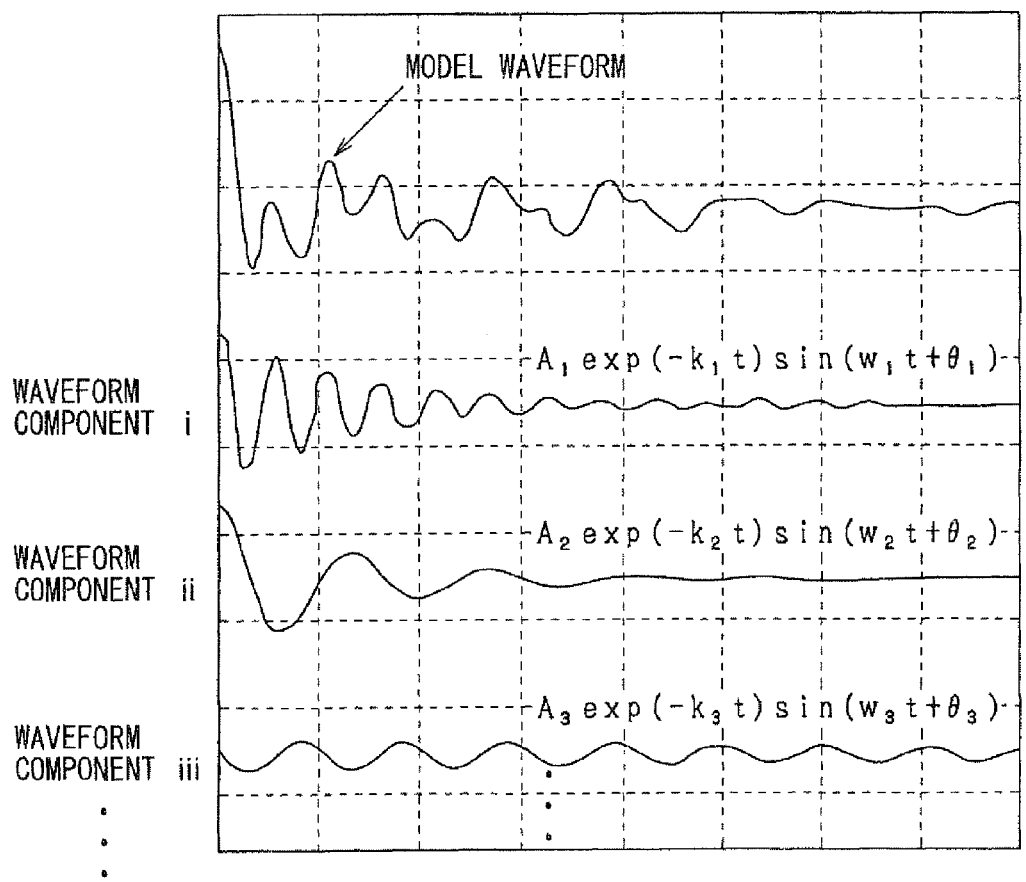

FIGS. 11A and 11B are diagrams for explaining examples of the damped oscillation equations to be overlapped with each other. The fuel pressure pulsation caused in the injection holes 20f in connection with the fuel injection is damped inside the injector 20 in a path, through which the fuel pressure pulsation propagates from the injection holes 20f to the fuel pressure sensor 20a (refer to mark i in FIG. 11A). The waveform component i in FIG. 11B shows the damped oscillation caused inside the injector 20 in this way.

The fuel pressure pulsation caused in the injection holes 20f in connection with the fuel injection reaches the orifice 12a via the injector 20 and the high pressure pipe 14. Then, the fuel pressure pulsation is reflected at the orifice 12a and propagates to the fuel pressure sensor 20a (refer to mark ii in FIG. 11A). The waveform component ii in FIG. 11B shows the damped oscillation propagating from the orifice 12a to the fuel pressure sensor 20a in this way.

The fuel pressure pulsation caused in connection with the fuel injection in the injection holes 20f of the other injector 20(#3) propagates to the fuel pressure sensor 20a of the injector 20(#2) via the common rail 12 (refer to mark iii in FIG. 11A). The waveform component iii in FIG. 11B shows the damped oscillation propagating to the fuel pressure sensor 20a in this way.

Figure 12:
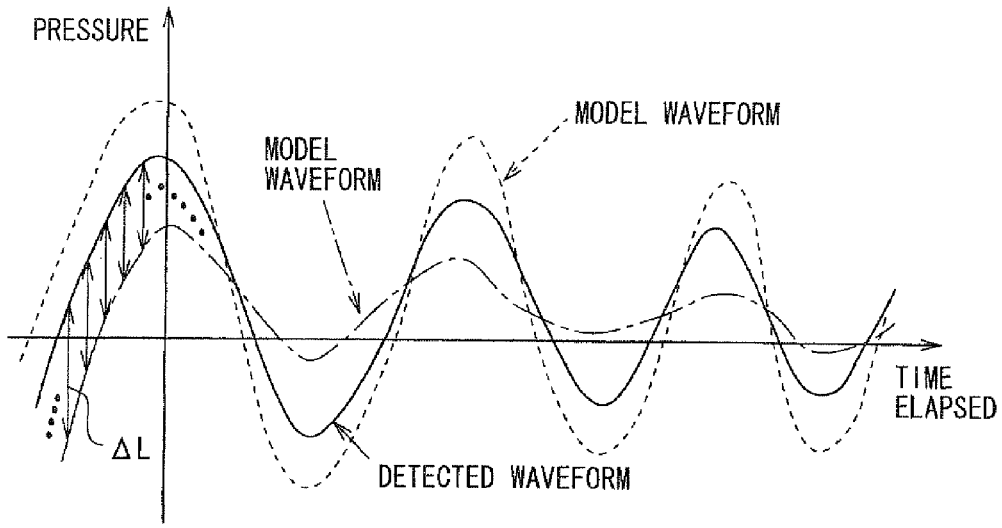
FIG. 12 is a diagram showing a deviation between a model waveform and a detected waveform according to the first embodiment.

The model formula of Expression 1 is constituted by combining the damped oscillation equations of the multiple waveform components i-iii illustrated above. Thus, the model waveform defined by the model formula turns into the waveform shown in the uppermost portion of FIG. 11B. A solid line in FIG. 12 shows the actual detected waveform detected with the fuel pressure sensor 20a. A chained line and a broken line show the model waveforms. The above-mentioned various parameters p0, A, k, ω, θ in the model formula are learned to reduce the deviation of the model waveform from the detected waveform to zero, that is, to heighten an approximation degree of the model waveform with respect to the actual detected waveform.

Next, a learning procedure of the parameters p0, A, k, ω, θ as a substantial part of the present embodiment will be explained with reference to FIG. 13 and FIGS. 14A to 14F. Although FIGS. 14A to 14F show changes of only the two parameters A, ω and do not illustrate changes of the other parameters p0, k, θ, the other parameters p0, k, θ also change like the parameters A, ω.

Figure 13:
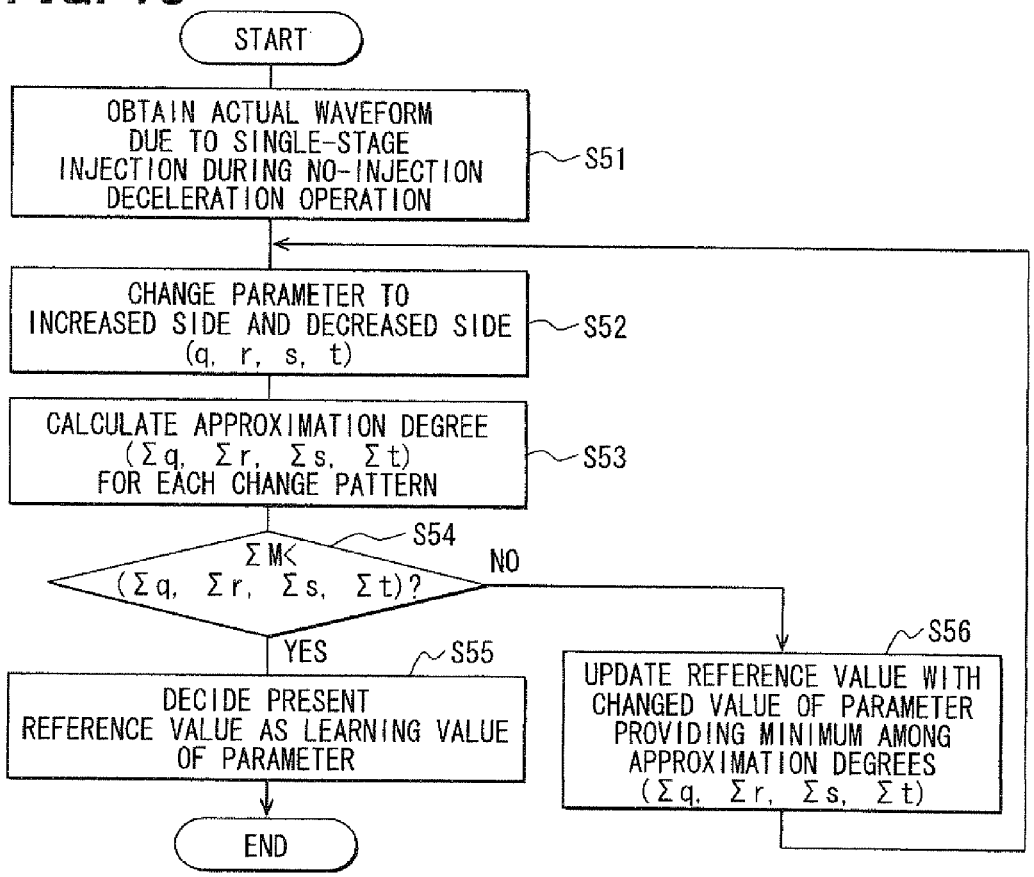
FIG. 13 is a flowchart showing a procedure for learning multiple parameters of a model formula according to the first embodiment.

The microcomputer of the ECU 30 performs a series of learning processing shown in FIG. 13 in a predetermined cycle (for example, a cycle of the computation performed by the CPU described above) or at a predetermined interval of the crank angle. First in S51, a single-stage small injection for injecting small quantity of the fuel only once during a combustion cycle is performed in a period when the fuel injection is suspended and the engine rotation speed NE is decreasing, i.e., during a no-injection deceleration operation period. The detected waveform of the fuel pressure sensor 20a caused in connection with the single-stage small injection is obtained as a learning standard value.

In following S52 (a parameter changing section), the parameters p0, A, k, ω, θ are changed to increased sides and to decreased sides respectively with a small interval. In an example of FIG. 14A, in the case where the values of the parameters A, ω corresponding to a position of mark 1 are used as reference values, the values of the parameters A, ω are changed to the increased sides and to the decreased sides respectively from the reference values. That is, the parameter A is changed to values corresponding to positions of marks q, r, and the parameter ω is changed to values corresponding to positions of mark s, t.

In following S53 (an approximation degree calculating section), the approximation degree of the model waveform with respect to the actual detected waveform is calculated for each combination of the changes. The least-square method is adopted in the present embodiment to calculate the approximation degree. For example, distance ΔL (deviation amount) between a value of the model waveform shown by the chained line of FIG. 12 and a value of the detected waveform in each of predetermined times is calculated, and summation of the distances ΔL in the predetermined times is defined as the approximation degree of the model waveform with respect to the detected waveform. Therefore, it can be said that the approximation degree heightens as the value of the summation Σx decreases.

In following S54 (a determining section), it is determined whether an update end condition is satisfied. The update end condition is a condition that the approximation degree ΣM at the reference values M is higher than any of approximation degrees Σq, Σr; Σs, Σt after the change. The reference values M in FIG. 14A are the values of the parameters A, ω corresponding to the mark 1.

If it is determined that at least one of the approximation degrees Σq, Σr, Σs, Σt is higher than the approximation degree ΣM and it is determined that the update end condition is not satisfied (S54: NO), in following S56 (a reference value updating section), the combination of the changes providing the smallest value among the approximation degrees Σq, Σr, Σs, Σt is employed as the combination of the updated reference values, thereby updating the reference values.

Figure 14A:
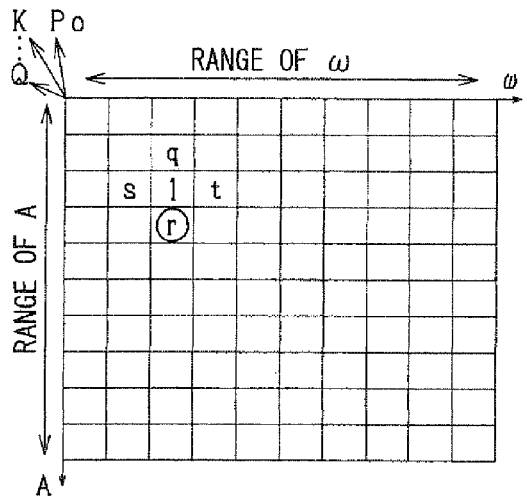
FIGS. 14A to 14F are diagrams for explaining a parameter changing section and a reference value updating section according to the first embodiment.
Figure 14B:
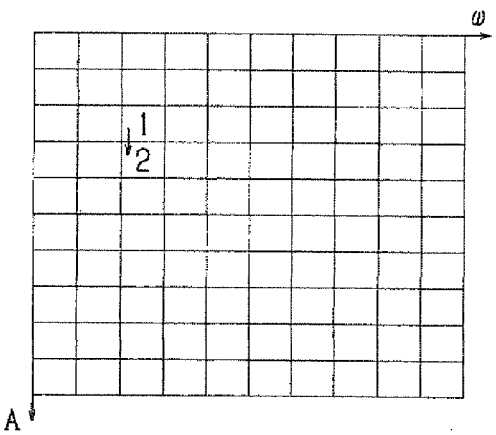

FIG. 14A shows an example in which the value of the approximation degree Σr is the smallest. Therefore, the combination of the values of the parameters A, ω corresponding to the position of the mark r is used as the combination of the updated reference values, thereby updating the reference values. Mark 2 in FIG. 14B shows the position corresponding to the reference values of the parameters A, ω after the update.

Figure 14C:
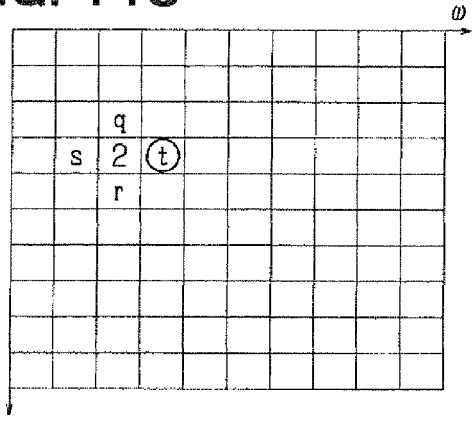

If the update is made in this way, the process returns to S52 and the change by the parameter changing section S52, the calculation by the approximation degree calculating section S53 and the determination by the determining section S54 are performed repeatedly. Therefore, in the example of FIGS. 14A to 14F, after the reference values are changed from the values corresponding to the position of the mark 1 to the values corresponding to the position of the mark 2, the values of the parameters A, ω are changed to the values corresponding to positions of marks q, r, s, t with respect to the reference values corresponding to the mark 2 as shown in FIG. 14C. Then, approximation degrees Σq, Σr, Σs, Σt are calculated. Then, it is determined whether the update end condition is satisfied based on the comparison between the approximation degree Σ2 and the approximation degrees Σq, Σr, Σs, Σt.

Figure 14D:
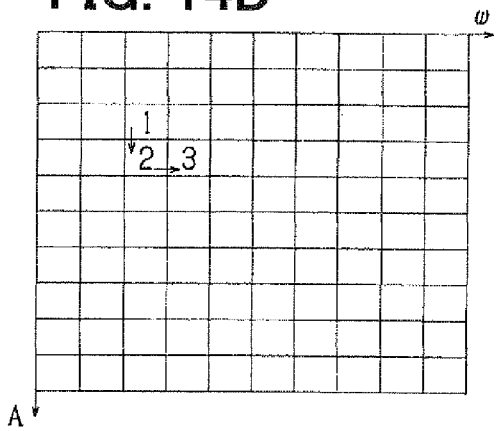
Figure 14E:
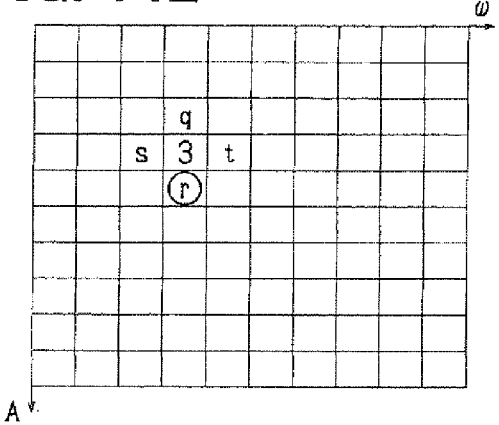
Figure 14F:
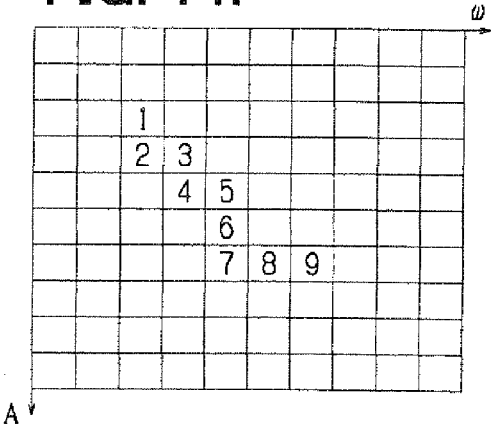

In the example of FIG. 14C, the combination of the values of the parameters A, ω corresponding to the position of the mark t is employed as the combination of the updated reference values, thereby updating the reference values. In FIG. 14D, mark 3 shows the position corresponding to the reference values of the parameters A, ω after the update. In following FIG. 14E, the combination of the values of the parameters A, ω corresponding to the position of the mark r are employed as the updated reference values, thereby updating the reference values. As the result of the repetition of the update in this way, the value of the approximation degree Σ9 becomes smaller than any of the values of the approximation degrees Σq, Σr, Σs, Σt (i.e., Σ9<(Σq, Σr, Σs, Σt)) and the update end condition is satisfied when mark 9 is used as the position of the reference values as shown in FIG. 14F.

When it is determined that the update end condition is satisfied (S54: YES), the present reference values are decided as the learning values of the parameters A, ω in S55 (a learning value deciding section). In the example of FIG. 14F, the combination of the values of the parameters A, ω corresponding to the position of the mark 9 are decided as the learning values of the parameters A, ω. The values of the parameters A, ω stored in the map are corrected into the reference values and learned.

For example, median of an existence range of the parameter may be used as the initial value of the reference value, which is to be updated in the above-described way. Alternatively, a value set by adaptation may be used as the initial value. The existence ranges where the values of the parameters p0, A, k ω, θ can exist are set beforehand (refer to arrow marks in FIG. 14A) based on the waveforms in the area where the detected waveform can exist. The change ranges of the parameters changed in S52 are restricted to the existence ranges. That is, if the reference value is located on the boundary of the existence range when the reference value is changed by the parameter changing section S52, the change across the boundary is prohibited.

The present embodiment described above exerts following effects.

(1) With the actions of the parameter changing section S52, the approximation degree calculating section S53, the determining section S54, the reference value updating section S56 and the learning value deciding section S55 shown in FIG. 13, for example, the calculation of the approximation degree of all the combinations of ten values of the parameter A and ten values of the parameter ω shown in FIGS. 14A to 14F can be rendered unnecessary. That is, it is not necessary to calculate the approximation degree $10^2$ times (=a hundred times).

More specifically, in the example of FIGS. 14A to 14F, the time number of the calculation of the approximation degree is 36 times (=4×9) consisting of the calculations at q, r, s, t for the mark 1, the calculations at q, r, s, t for the mark 2, . . . , and the calculations at q, r s, t for the mark 9. When the seventeen parameters are used in the example of FIGS. 14A to 14F, the time number of the calculation of the approximation degree is 5780 times even in the worst case. Thus, the calculation processing amount can be reduced greatly as compared to the case where the calculation is performed for the entire combinations and where the time number of the calculation amounts to $10^{17}$ times (=a hundred quadrillion times).

Accordingly, the calculation processing amount can be reduced as compared to the case where the calculation is performed by assigning the values in the entire existence ranges of all the multiple parameters p0, A, k, ω, θ to the model formula.

(2) The existence ranges where the values of the parameters p0, A, k, ω, θ can exist (refer to the arrow marks in FIG. 14A) are set beforehand based on the waveforms in the area where the detected waveform can exist. The change ranges of the parameters changed in S52 are restricted to the existence ranges. Therefore, problems of the arithmetic processing such as the divergence of the calculated value of the approximation degree can be avoided.

(Second Embodiment)

Next, a second embodiment of the present invention will be described.

In the above-described first embodiment, the preset value such as the median of the existence range is used as the initial value of the reference value to be updated in S56. In contrast, in the present embodiment, an initial value setting section (refer to S511 of FIG. 15) explained in detail later is provided for setting the initial value that heightens the approximation degree. In the above-described first embodiment, when the update end condition is satisfied in S54, the reference value at the time is decided as the learning value of the parameter. In contrast, in the present embodiment, a learning value verifying section (refer to S541, S542 and S543 of FIG. 15) explained in detail later is provided for verifying whether the reference value at the time when the update end condition is satisfied is appropriate as the learning value.

Figure 15:
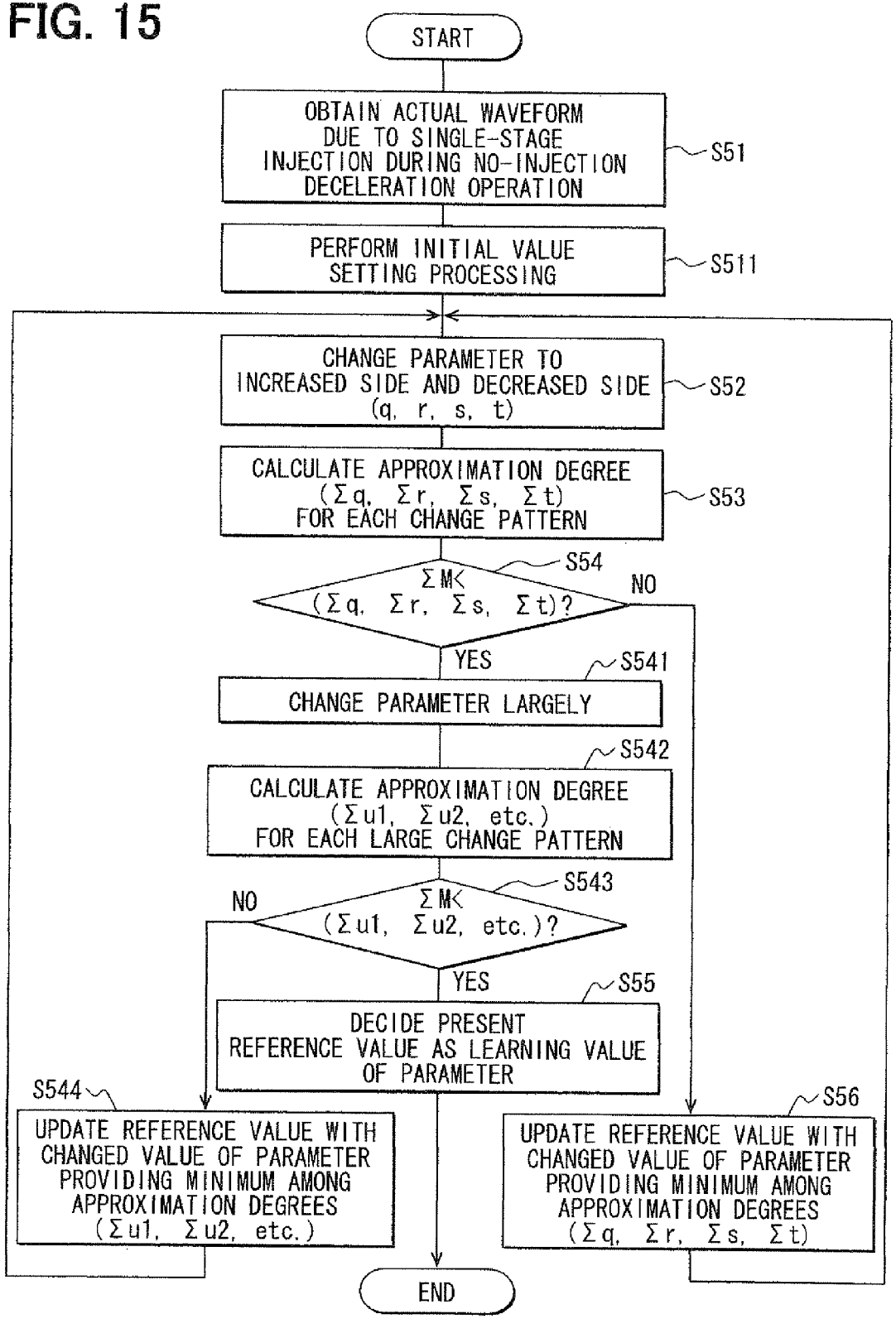
FIG. 15 is a flowchart showing a procedure for learning multiple parameters of a model formula according to a second embodiment of the present invention.

FIG. 15 is a flowchart showing a learning procedure of the parameters p0, A, k, ω, θ according to the present embodiment. Parts in FIG. 15 performing the same processing as FIG. 13 are designated with the same reference numerals as FIG. 13 and the explanation of FIG. 13 is similarly applied to such the parts.

First, in S51, a detected waveform as a learning standard value is obtained. In following S511 (an initial value setting section), the existence area is divided into multiple areas (refer to A1, A2, ω1, ω2 show in FIG. 16A). Approximation degrees ΣM1, ΣM2, ΣM3, ΣM4 are calculated for respective representing values set for the multiple areas respectively (for example, the medians M1, M2, M3, M4 of the divided areas). The approximation degrees ΣM1, ΣM2, ΣM3, ΣM4 are compared with each other, and the representing values providing the highest approximation degree are set as the initial values of the reference values. In the example of FIGS. 16A to 16D, the value of the approximation degree ΣM1 is the smallest, so the representing values M1 are set as the initial values.

Figure 16A:
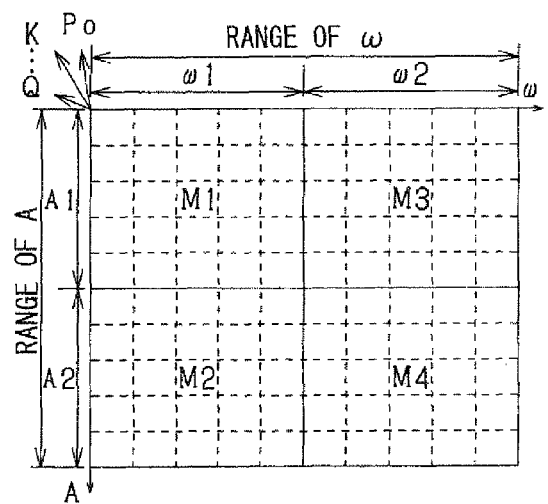
FIGS. 16A to 16D are diagrams for explaining the procedure for learning the multiple parameters of the model formula according to the second embodiment.

In following S52, the parameters p0, A, k, ω, θ are changed to the increased sides and the decreased sides with the small intervals respectively. In following S53, the approximation degree is calculated for each combination of the changes. In following S54, it is determined whether an update end condition is satisfied. The update end condition is a condition that the approximation degree ΣM1 at the reference values M1 is higher than any of the approximation degrees Σq, Σr, Σs, Σt after the change. The reference values in FIG. 16A are the values of the parameters A, ω corresponding to the mark M1.

Figure 16B:
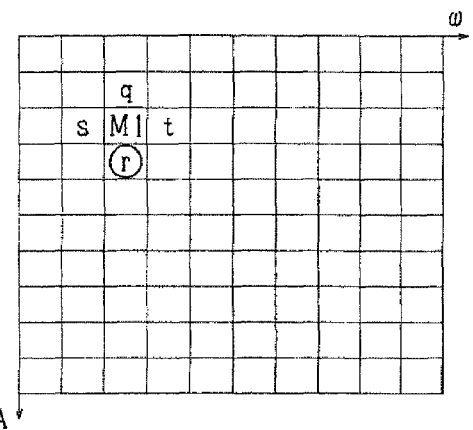
Figure 16C:
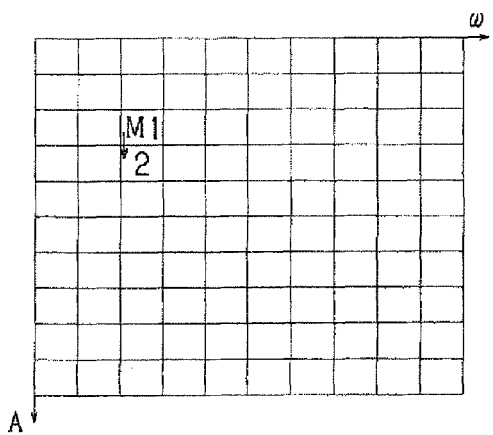

When it is determined that the update end condition is not satisfied (S54: NO), in following S56, the combination of the changes in the case of the smallest value among the values of the approximation degrees Σq, Σr, Σs, Σt is employed as the combination of the updated reference values, thereby updating the reference values. FIG. 16B shows a case where the value of the approximation degree Σr is the smallest. The combination of the values of the parameters A, ω corresponding to the position of the mark r is employed as the combination of the updated reference values, thereby updating the reference values. Mark 2 in FIG. 16C shows the position corresponding to the reference values of the parameters A, ω after the update.

Figure 16D:
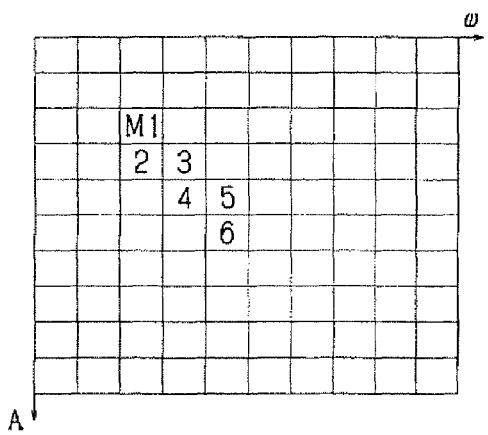

If the update is made in this way, the processing returns to S52. Thus, the change by the parameter changing section S52, the calculation by the approximation degree calculating section S53 and the determination by the determining section S54 are performed repeatedly. In the example of FIGS. 16A to 16D, the reference values are updated sequentially from the values corresponding to the position of the mark M1 to the values corresponding to the positions of the marks 2, 3, 4, 5, 6 in this order. When the mark 6 is employed as the position of the reference values as shown in FIG. 16D, the value of the approximation degree Σ6 is smaller than any of the values of the approximation degrees Σq, Σr, Σs, Σt (i.e., Σ6<(Σq, Σr, Σs, Σt)) and the update end condition is satisfied.

Figure 17A:
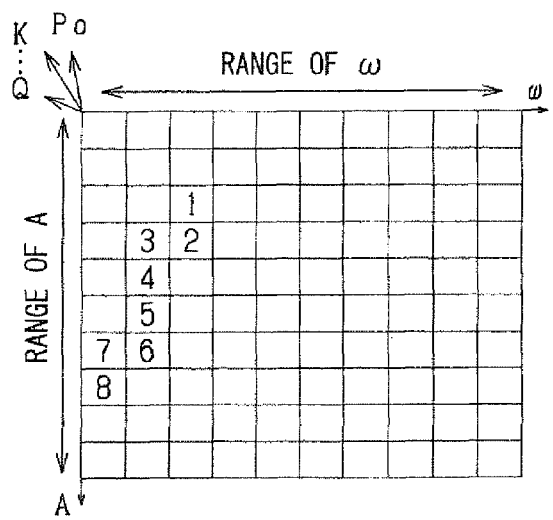
FIGS. 17A to 17D are diagrams for explaining a procedure for learning the multiple parameters of the model formula according to the second embodiment.

When it is determined that the update end condition is satisfied (S54: YES), the reference values are changed in S541 (a large change performing section) more largely than the change performed by the parameter changing section S52. That is, large change is performed. FIGS. 17A to 17D show a mode of the updating state of the reference values in the case where the processing of the learning value verifying section S541, S542, S543 is performed. For example, as shown in FIG. 17A, when the reference values are serially updated from the values corresponding to the mark 1 to the values corresponding to the positions of the marks 2, 3, 4, 5, 6, 7, 8 in this order and the update end condition is satisfied at the position of the mark 8, the large change performing section S541 largely changes the parameters p0, A, k, ω, θ to the values corresponding to positions of marks u1 to u6 respectively. In the example of FIGS. 17A to 17D, a size provided by dividing each of the existence ranges of the parameters A, ω by N (N=10) is regarded as the small interval used in S52. The change larger than the small interval is performed in S541.

In following S542 (an approximation degree calculating section), the approximation degree of the model waveform with respect to the actual detected waveform is calculated for each combination of the large changes. In following S543 (a determining section), it is determined whether a learning permission condition is satisfied. The learning permission condition is a condition that the approximation degree Σ8 at the reference values M is higher than any of the approximation degrees Σu1 to Σu6 after the large change. The reference values in FIG. 17B are the values of the parameters A, ω corresponding to the mark 8.

When it is determined that at least one of the approximation degrees Σu1 to Σu6 is higher than the approximation degree Σ8 and it is determined that the learning permission condition is not satisfied (S543. NO), in following S544 (a reference value updating section), the combination of the changes providing the smallest value among the approximation degrees Σu1 to Σu6 is employed as the combination of the updated reference values, thereby updating the reference values.

Figure 17B:
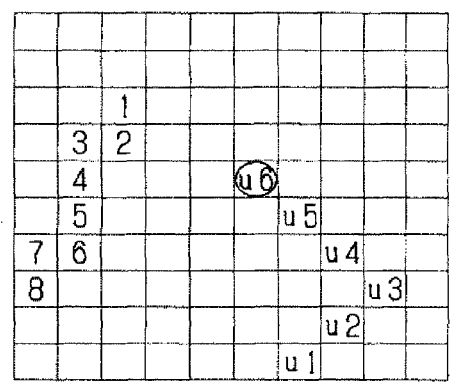

FIG. 17B shows the case where the value of the approximation degree Σu6 is the smallest. The combination of the values of the parameters A, ω corresponding to the position of the mark u6 is employed as the combination of the updated reference values, thereby updating the reference values. If the update is made in this way, the process returns to S52 and the change by the parameter changing section S52, the calculation by the approximation degree calculating section S53 and the determination by the determining section S54 are performed repeatedly.

Figure 17C:
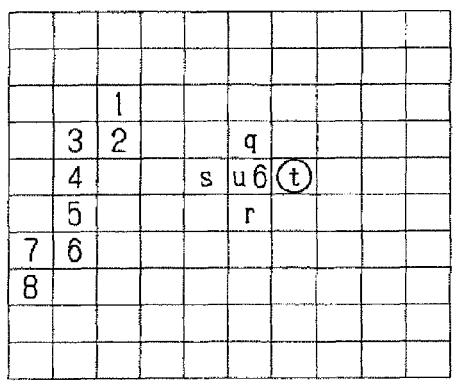
Figure 17D:
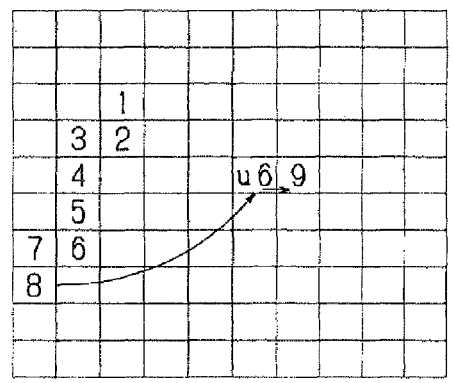

Therefore, in the example of FIGS. 17A to 17D, after the reference values are serially changed from the values corresponding to the position of the mark 1 to the values corresponding to the position of the mark 8, the update end condition is satisfied at the reference values corresponding to the mark 8. Then, the large change to the position of the mark u6 is made and the updated is performed. As shown in FIG. 17C, the parameters A, ω are changed to the values corresponding to the positions of the marks q, r, s, t with respect to the reference values corresponding to the mark u6, and the approximation degrees Σq, Σr, Σs, Σt are calculated respectively. Then, it is determined whether the update end condition is satisfied based on the comparison between the approximation degree Σu6 and the respective approximation degrees Σq, Σr, Σs, Σt. In the example of FIG. 17C, the reference values are updated from the values corresponding to the position of the mark u6 to the values corresponding to the position of the mark t. When the mark 9 is employed as the position of the reference values as shown in FIG. 17D, the value of the approximation degree Σ9 is smaller than any of the values of the approximation degrees Σq, Σr, Σs, Σt (i.e., Σ9<(Σq, Σr, Σs, Σt)) and the update end condition is satisfied.

When it is determined in S543 that the learning permission condition is satisfied (S543: YES), the present reference values are decided as the learning values of the parameters A, ω in following S55 (a learning value deciding section). In the example of FIG. 17D, the combination of the values of the parameters A, ω corresponding to the position of the mark 9 are decided as the learning values of the parameters A, ω. The values of the parameters A, ω stored in the map are corrected into the reference values and learned.

Thus, the reference values are changed largely and it is determined whether the learning permission condition is satisfied even when the update end condition is satisfied. If the learning permission condition is not satisfied (S543: NO), deciding the reference values before the large change as the learning values is prohibited. When the above prohibition is performed, the update is performed again by using the values of the parameters after the large change as the reference values. In the example of FIGS. 17A to 17D, the combination of the values of the parameters A, ω corresponding to the position of the mark u6 are used as the combination of the updated reference values.

The present embodiment described above exerts following effects.

Figure 18:
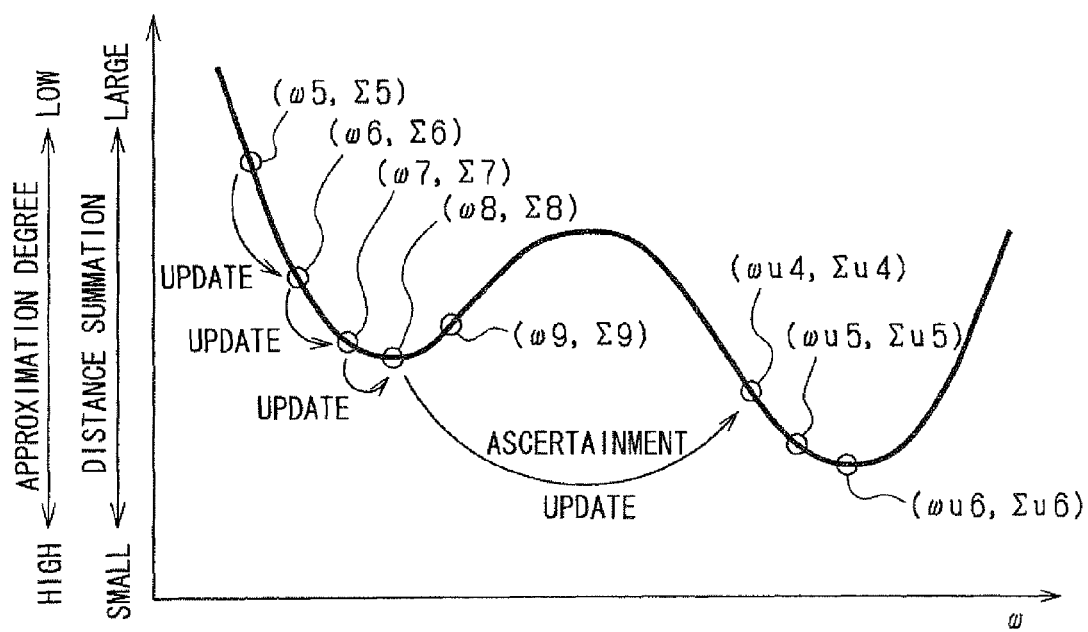
FIG. 18 is a diagram for explaining a relationship between change in the parameter and the approximation degree according to the second or third embodiment of the present invention.

(1) The reference values are changed largely even when the update end condition is satisfied. If the learning permission condition is not satisfied (S543: NO), deciding the reference values before the large change as the learning values is prohibited. Therefore, as shown in the example of FIG. 18, even when the value of the parameter ω is ω8 and satisfies the update end condition, the value of the parameter ω is changed largely from ω8 to ωu4. When the approximation degree Σu4 is higher than the approximation degree Σ8, deciding the value ω8 as the learning value is prohibited. Therefore, when the approximation degrees Σu4, Σu5, Σu6 at the values ωu4, ωu5, ωu6 are higher than the approximation degree Σ8 as shown in FIG. 18, deterioration of the learning accuracy, which is caused if the combination of the values of the parameters A, ω corresponding to the position of the mark 8 are learned as the combination of the learning values, can be avoided.

(2) When the above prohibition is performed, the update is performed by using the values of the parameters after the large change as the reference values. The value of the parameter after the large change is u6 in the example of FIGS. 17A to 17D and is ωu4 in the example of FIG. 18. In the example of FIG. 18, the value is serially changed and updated to ωu5 and ωu6 after that. Thus, the value of the parameter is learned to improve the approximation degree more, so the learning accuracy can be improved.

Third Embodiment

Next, a third embodiment of the present invention will be described.

In the above-described second embodiment, it is determined whether the learning permission condition is satisfied and whether to prohibit the learning based on whether the approximation degree Σ8 at the reference values corresponding to the mark 8 before the large change is higher than any of the approximation degrees Σu1 to A, Σu6 after the large change.

In contrast, in the present embodiment, the large change (first change) is performed as in S541, and then, larger change (second change) from the reference values before the large change is performed. That is, in the example of FIG. 18, the first change is performed from the reference value ω8 to the value ωu4 and the approximation degree Σu4 at the value ωu4 is calculated. In addition, the second change is performed from the reference value ω8 to the value ωu5 and the approximation degree Σu5 at the value ωu5 is calculated. The learning is prohibited when the approximation degree Σu5 is higher than the approximation degree Σu4 (i.e., when Σu5<Σu4). That is, a condition Σu5≧Σu4 is used as the learning permission condition.

In the example of FIG. 18, even in the case where the approximation degree Σω8 is higher than the approximation degree Σu4, if the approximation degree Σu5 is higher than the approximation degree Σu4 when the change from ω8 to ωu5, which is larger than the change from ω8 to ωu4, is performed, it can be said that there is a possibility that a parameter ω that provides the approximation degree higher than the approximation degree Σ8 is found.

In the present embodiment taking this point into account, the learning permission condition is determined based on whether there exists an area, in which the approximation degree at a certain point increases as the certain point becomes more distant from the reference value, in an area largely distant from the reference value. Therefore, the certainty of finding the value of the parameter ω providing the high approximation degree can be heightened, and eventually the deterioration of the learning accuracy can be avoided. When the above-described prohibition is performed, the value of the parameter after the second change is employed as the updated reference value, thereby updating the reference value. Accordingly, the reference value is changed and updated into u6 after that in the example of FIG. 18. Thus, the value of the parameter is learned to improve the approximation degree more. As a result, the learning accuracy can be improved further.

Other Embodiments

The above-described embodiments may be modified and implemented as follows, for example. Moreover, the present invention is not limited to the above-described embodiments. Characteristic constructions of the respective embodiments may be combined arbitrarily.

The parameter changing section S52 according to the above-described first embodiment changes the value to the increased side and the decreased side with the fixed change amount. Alternatively, the change amount may be decreased as the time number of the updates performed by the reference value updating section S56 increases. With such the construction, when the reference value is updated from the initial value until the update end condition is satisfied, the updating time number can be reduced as compared to the case where the change amount is uniformly small from the initial stage to the later stage of the update. In addition, as compared with the case where the change amount is uniformly large from the initial stage to the later stage of the update, the approximation degree of the reference value at the time when the update end condition is satisfied can be improved, so the learning accuracy can be improved. That is, both of the reduction of the update time number and the improvement of the learning accuracy can be achieved at the same time.

For example, the parameter changing section S52 according to the above-described first embodiment performs the change to the increased side and the decreased side with the size obtained by dividing the existence range of the parameter by N (N is ten in the example of FIGS. 14A to 14F). Alternatively, the division number N may be increased as the time number of the updates performed by the reference value updating section S56 increases. Thus, the change amount can be set variably as described above.

In the above-described first embodiment, in S51, the single-stage small injection is performed during the no-injection deceleration operation and the detected waveform at the time is obtained as the learning standard value. In short, as long as a portion of the fuel pressure waveform that suffers only little interference of the fuel pressure fluctuation due to the other injection can be obtained, the portion of the detected waveform in such the state may be employed as the learning standard value. Therefore, even when multiple injections overlap with each other in the waveform as shown in the example of FIG. 7, a portion of the waveform with the low degree of the overlap may be extracted and used as the learning standard value.

When the parameters p0, A, k, ω, θ are learned, if the learning is performed in accordance with each engine operation state, the optimum model formula corresponding to the operation state can be obtained. Therefore, the approximation degree of the model formula can be improved. For example, the operation state includes the engine rotation speed NE, the load of the internal combustion engine (for example, the command injection quantity of the fuel, the accelerator operation amount by the driver and the like), the fuel temperature, the fuel pressure in the common rail 12, the fuel supply quantity from the fuel pump 11 to the common rail 12 and the like.

In the case where the existence area of the parameters are divided into the multiple areas as shown in FIG. 16A, the change by the parameter changing section S52, the calculation by the approximation degree calculating section S53, the determination by the determining section S54, the update by the reference value updating section S56 and the decision by the learning value deciding section S55 may be performed for each of the divided areas. Then, the combination of the parameter values that provides the highest approximation degree among the learning values decided in the areas may be decided as the combination of the final learning values.

In the above-described embodiments, when the parameter changing section S52 changes the parameters p0, A, k, ω, θ to the increased side and the decreased side with the small interval by using the size of the small interval, the size obtained by dividing the existence range of each of the parameters p0, A, k, ω, θ by N is used as the small interval. The same division number N may be used for the parameters p0, A, k, ω, θ. Alternatively, the small interval may be set such that the different division numbers N are used for the parameters p0, A, k, ω, θ respectively.

When the fuel pressure sensor 20a is fixed to the injector 20, the fuel pressure sensor 20a is fixed to the fuel inlet 22 of the injector 20 in the above-described embodiments. Alternatively, as shown by a chained line 200a in FIG. 2, a fuel pressure sensor 200a may be mounted inside the housing 20e to sense fuel pressure in the internal fuel passage 25 extending from the fuel inlet 22 to the injection holes 20f.

The fixing structure of the fuel pressure sensor 20a can be simplified in the case where the fuel pressure sensor 20a is fixed to the fuel inlet 22 as described above as compared with the case where the fuel pressure sensor 200a is mounted inside the housing 20e. When the fuel pressure sensor 200a is mounted inside the housing 20e, the fixing position of the fuel pressure sensor 200a is closer to the injection holes 20f than in the case where the fuel pressure sensor 20a is fixed to the fuel inlet 22. Therefore, the pressure fluctuation in the injection holes 20f can be sensed more suitably.

A flow rate restricting section may be provided between the common rail 12 and the high-pressure pipe 14 for restricting a flow rate of the fuel flowing from the common rail 12 to the high-pressure pipe 14. The flow rate restricting section functions to block the flow passage when an excessive fuel outflow is generated by fuel leakage due to a damage to the high-pressure pipe 14, the injector 20 or the like. For example, the flow rate restricting section may be constituted by a valve member such as a ball that blocks the flow passage when the excessive flow rate occurs. Alternatively, a flow damper constituted by integrating the orifice 12a (the fuel pulsation reducing section) and the flow rate restricting section may be adopted.

In place of the construction of arranging the fuel pressure sensor 20a downstream of the orifice and the flow rate restricting section with respect to the fuel flow direction, the fuel pressure sensor 20a may be arranged downstream of at least one of the orifice and the flow rate restricting section.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A learning device that has a storing means for storing a model formula expressing a detected waveform with a mathematical expression, the detected waveform being detected with a sensor that detects a physical quantity change, the learning device configured to learn values of multiple parameters included in the model formula to improve an approximation degree of a model waveform expressed with the model formula with respect to the actual detected waveform, the learning device comprising:

a parameter changing means for changing each of the multiple parameters to an increased side and to a decreased side with respect to a reference value set for each of the multiple parameters;

an approximation degree calculating means for calculating the approximation degree for each combination of the changes of the multiple parameters;

a determining means for determining whether an update end condition is satisfied, the update end condition being a condition that the approximation degree in the case where the multiple parameters are set at the reference values is higher than any of the approximation degrees in the case where the parameters are set at the changed values;

a reference value updating means for updating the reference values by using the combination of the changes, which provides the highest approximation degree among the approximation degrees corresponding to the changed values, as the updated reference values while the update end condition is not satisfied;

a learning value deciding means for deciding that the reference values are to be considered as learning values of the multiple parameters when the update end condition is satisfied; and an extracting means for extracting a waveform component resulting from an n-th injection by subtracting a waveform component resulting from an m-th injection preceding the n-th injection from a waveform portion of the detected waveform corresponding to the n-th injection when multiple injection for performing the fuel injection multiple times per combustion cycle is performed, wherein the change by the parameter changing means, the calculation by the approximation degree calculating means and the determination by the determining means are repeatedly performed every time the update is performed by the reference value updating means, the sensor is a fuel pressure sensor that is mounted to an internal combustion engine structured to distribute and supply fuel from a pressure accumulator accumulating the fuel to multiple injectors and that senses pressure of the fuel supplied to the injector as the physical quantity change, the sensor is arranged in a fuel passage, which extends from the pressure accumulator to an injection hole of the injector, at a position closer to the injection hole than the pressure accumulator, and the extracting means uses the model waveform defined by the parameters learned by the learning device as the waveform component resulting from the m-th injection.

2. The learning device as in claim 1, wherein the reference value is changed more largely than the change performed by the parameter changing means when the update end condition is satisfied, and the learning value deciding means is prohibited from deciding the reference value as the learning value when the approximation degree calculated for the parameter after the large change is higher than a predetermined range of the approximation degree calculated for the parameter before the large change.

3. The learning device as in claim 2, wherein the reference value is updated by using the value of the parameter after the large change as the updated reference value when the prohibition is performed.

4. The learning device as in claim 1, wherein a first change is performed for changing the reference value more largely than the change performed by the parameter changing means, and a second change is performed for changing the reference value more largely than the first change when the update end condition is satisfied, and the learning value deciding means is prohibited from deciding the reference value as the learning value when the approximation degree after the second change is higher than a predetermined range of the approximation degree after the first change.

5. The learning device as in claim 4, wherein the reference value is updated by using the value of the parameter after the second change as the updated reference value when the prohibition is performed.

6. The learning device as in claim 1, wherein the internal combustion engine is an internal combustion engine for a vehicle.

7. The learning device as in claim 1, wherein the learning device learns the values of the multiple parameters for each operation state of the internal combustion engine in accordance with the operation state of the internal combustion engine.

8. The learning device as in claim 1, wherein an existence area, in which the values of the parameters can exist, is set beforehand based on waveforms in an area where the detected waveform can exist, the existence area is divided into multiple areas, the approximation degrees calculated for representing values set for the respective areas are compared with each other, and the representing value, which provides the highest approximation degree, is used as an initial value of the reference value set before the update performed by the reference value updating means.

9. The learning device as in claim 1, wherein initial values of the multiple parameters used before the parameter changing means performs the change are based on a result of experiment measuring the detected waveform of the sensor with respect to a known physical quantity change.

10. The learning device as in claim 1, wherein an existence range, in which the value of the parameter can exist, is set beforehand based on the waveforms in an area where the detected waveform can exist, and the parameter changing means performs the change to the increased side and to the decreased side with a size obtained by dividing the existence range by N, which is a positive integer number.

11. The learning device as in claim 1, wherein the parameter changing means decreases amount of the change as time number of the update performed by the reference value updating means increases.

12. The learning device as in claim 1, wherein an existence range, in which the value of the parameter can exist, is set beforehand based on the waveforms in an area where the detected waveform can exist, and a range of the change by the parameter changing means is restricted to the existence range.

13. The learning device as in claim 1, wherein multiple deviation amounts between the model waveform and the actual detected waveform are calculated at multiple points of the waveform, summation of the multiple deviation amounts obtained by the calculation is employed as the approximation degree, and the approximation degree heightens as the value of the summation decreases.

14. A fuel injection system comprising:

the learning device as in claim 1; and the sensor that detects the physical quantity change, and that learns values of multiple parameters included in the model formula to improve an approximation degree of the model waveform expressed with the model formula with respect to the actual detected waveform, wherein the sensor is a fuel pressure sensor that is mounted to an internal combustion engine structured to distribute and supply fuel from a pressure accumulator accumulating the fuel to multiple injectors and that senses pressure of the fuel supplied to the injector as the physical quantity change, and the sensor is arranged in a fuel passage, which extends from the pressure accumulator to an injection hole of the injector, at a position closer to the injection hole than the pressure accumulator.

* * * * *